US006999191B2

(12) United States Patent
Yamada et al.

(10) Patent No.: US 6,999,191 B2
(45) Date of Patent: Feb. 14, 2006

(54) ADMINISTRATING SYSTEM OF IMAGE FORMING APPARATUS AND IMAGE FORMING APPARATUS

(75) Inventors: Kei Yamada, Tokyo (JP); Tetsuo Kimoto, Tokyo (JP); Tomoya Yoshida, Tokyo (JP); Ikuya Hotta, Tokyo (JP); Kazuo Izumi, Tokyo (JP); Kunio Shijyo, Tokyo (JP)

(73) Assignee: Konica Corporation, Tokyo (JP)

( * ) Notice: Subject to any disclaimer, the term of this patent is extended or adjusted under 35 U.S.C. 154(b) by 940 days.

(21) Appl. No.: 09/884,591

(22) Filed: Jun. 19, 2001

(65) Prior Publication Data

US 2002/0054323 A1    May 9, 2002

(30) Foreign Application Priority Data

Jun. 22, 2000 (JP) ............................ 2000/187463
Jun. 28, 2000 (JP) ............................ 2000/194169
Aug. 11, 2000 (JP) ............................ 2000/244664

(51) Int. Cl.
G06K 15/02   (2006.01)
G06F 3/12    (2006.01)

(52) U.S. Cl. ............... 358/1.15; 358/1.16; 358/434; 399/8; 709/217

(58) Field of Classification Search .............. 358/1.15, 358/1.9, 3.23, 1.13, 1.16, 1.17, 403, 404, 358/434, 443; 709/217, 219, 216, 213; 399/8, 399/9, 77
See application file for complete search history.

(56) References Cited

U.S. PATENT DOCUMENTS

| 5,414,494 | A | | 5/1995 | Aikens et al. |
| 5,580,177 | A | * | 12/1996 | Gase et al. ................... 400/61 |
| 5,838,916 | A | * | 11/1998 | Domenikos et al. ........ 709/219 |
| 6,037,928 | A | * | 3/2000 | Nachinson et al. ......... 345/156 |
| 6,543,008 | B1 | * | 4/2003 | Ninomiya .................... 714/42 |
| 6,694,376 | B1 | * | 2/2004 | Ohara ......................... 709/250 |
| 2002/0141761 | A1 | * | 10/2002 | Kondo ........................... 399/8 |

FOREIGN PATENT DOCUMENTS

| EP | 0 843 230 | 5/1998 |
| JP | 10-322396 | 12/1998 |

* cited by examiner

*Primary Examiner*—Joseph R. Pokrzywa
(74) *Attorney, Agent, or Firm*—Frishauf, Holtz, Goodman & Chick, P.C.

(57) ABSTRACT

An image forming system, comprises an image forming apparatus including a first memory section to store a program to conduct a predetermined operation, and an image forming apparatus connecting section to connect the image forming apparatus with a network; and an administrating apparatus including an administrating memory section to store a rewrite program for the image forming apparatus, and an administrating apparatus connecting section to connect the administrating apparatus with the network. The image forming apparatus accesses the administrating apparatus through the network, obtains the rewrite program stored in the administrating memory section, and rewrites the program stored in the first memory section with the obtained rewrite program.

23 Claims, 14 Drawing Sheets

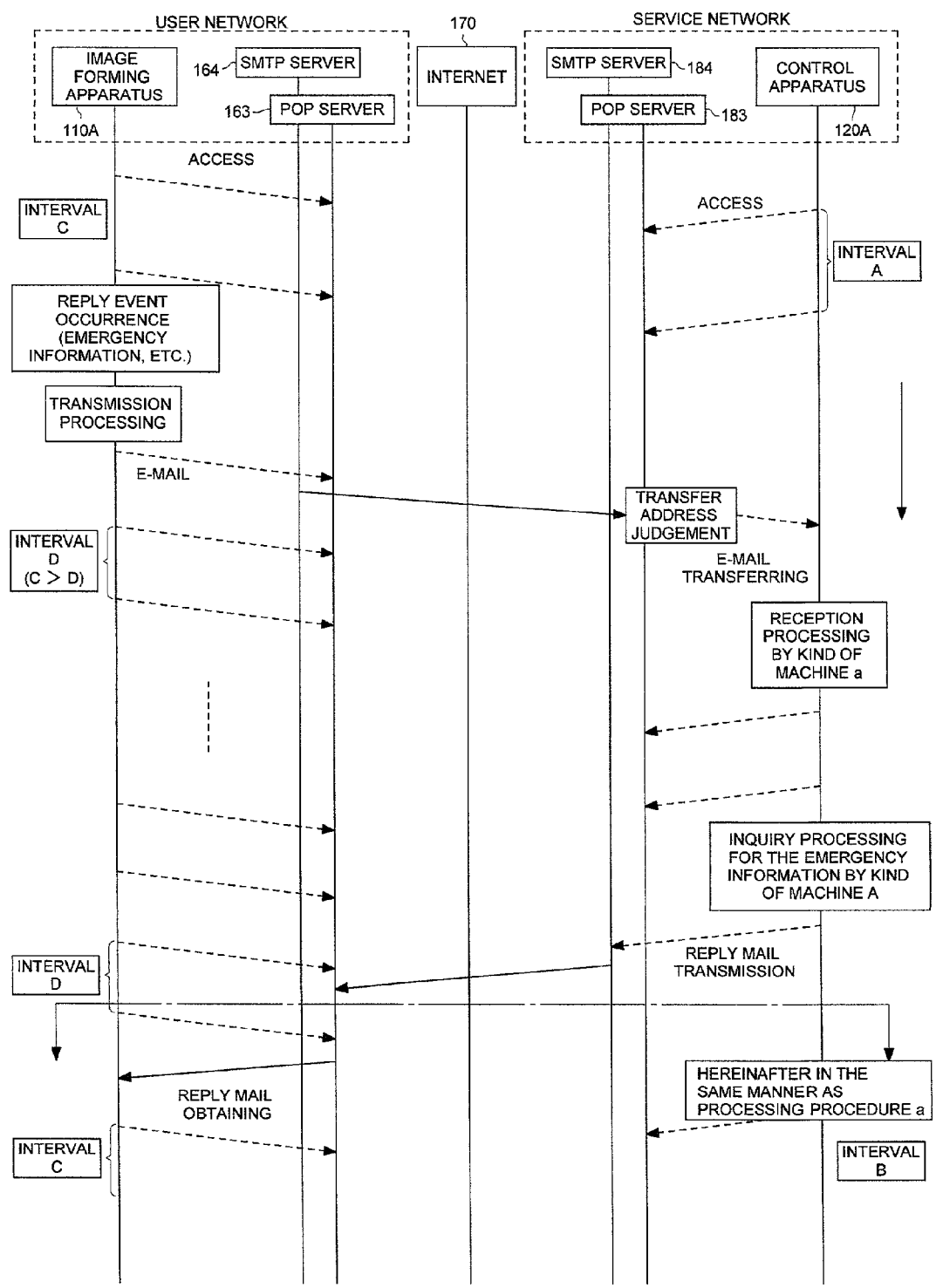

ADMINISTRATING SYSTEM OF IMAGE FORMING APPARATUS AND IMAGE FORMING APPARATUS

BACKGROUND OF THE INVENTION

The present invention relates to an administrating system to administrate an image forming apparatus, and to an image forming apparatus.

An image forming apparatus has a rewritable memory section in which a program is stored, and is operated based on the program, and forms an image onto a recording material. In the case where the version up or a bug correction of the program is conducted, the service man goes to a place in which the image forming apparatus is installed, and a ROM is replaced, or a memory card or personal computer is connected to the image forming apparatus, and the service man copes with the case by rewriting the program to a revised program (hereinafter called [rewrite program]) such as version-upped program or bug corrected program.

As described above, when the service man goes to a place in which the image forming apparatus is installed, and the program is rewritten by the rewrite program, it is necessary that the service man goes to all installation places, and the time and cost necessary for rewriting is very much increased.

Accordingly, in the present invention, the first object of the invention is to provide an image forming system and the image forming apparatus by which it is not necessary that the service man goes to the installation place, and the program of the image forming apparatus is rewritten to the rewrite program by a remote operation, thereby, the time and cost are reduced, and the finer control of the image forming apparatus can be attained.

Incidentally, when a remote administrating system by which a remote diagnosis of an administrating apparatus provided with an administrating function for the image forming apparatus, and an arbitrary numbers of image forming apparatus on the user side, connected to the administrating apparatus through the internet and user network, is conducted, is tried to be structured, the communication connection from the administrating apparatus side to the image forming apparatus side is difficult because it is limited by the fire wall (undesired access limitation apparatus) generally provided in the user network.

That is, the data communication of the image forming apparatus inside the fire wall on the user network side with the file administrating apparatus outside the fire wall is limited by the fire wall, in the case of the TCP/IP (Transmission Protocol/Internet Protocol), which is widely used protocol at the present, and particularly the access from the file administrating apparatus side to the image forming apparatus side is difficult.

Further, in one or a plurality of image forming apparatus, when the access by the TCP/IP is tried to the administrating apparatus outside the user network, and for example, the emergency information such as the apparatus fault is tried to be transmitted, there is sometimes a case where it is limited by the fire wall provided in the network according to the setting condition of the network on the administrating apparatus side.

In view of the foregoing, the present invention is attained, and the second object of the present invention is to provide a remote administrating system, image forming apparatus and administrating apparatus by which the electronic mail is used, and even from the administrating apparatus to the image forming apparatus inside the fire wall on the user network side, the communication can be made possible over the fire wall, further, even also from the image forming apparatus to the administrating apparatus inside the fire wall provided in the network on the administrating apparatus side, the communication can be made possible over the fire wall, and the transmission and reception of the remote diagnostic information or emergency information between the administrating apparatus and image forming apparatus can be very effectively conducted on the base of time.

SUMMARY OF THE INVENTION

The first object can be attained by the following structures.

(1) In an image forming system comprising: an image forming apparatus which has the first rewritable memory section in which the program is stored, and is operated based on the program, and conducts the image formation onto the recording material; a program administrating system having a control memory section in which the rewrite program of the image forming apparatus is stored; and a network to connect the image forming apparatus to the program administrating system, the image forming apparatus makes access to the program administrating system through the network, and obtains the rewrite program stored in the control memory section, and rewrites the program stored in the first memory section to the rewrite program.

(2) Further, the image forming system of the present invention comprises: an image forming apparatus which has the first rewritable memory section in which the program is stored, and is operated based on the program, and conducts the image formation onto the recording material; a program administrating system having a control memory section in which the rewitable program of the image forming apparatus is stored; and a network to connect the image forming apparatus to the program administrating system, wherein the image forming apparatus makes access to the program administrating system according to the down load instruction transmitted from the program administrating system, and obtains the rewrite program stored in the control memory section, and rewrites the program stored in the first memory section to the rewrite program.

(3) The image forming system of the present invention comprises: an image forming apparatus which has the rewritable first memory section in which the program is stored, and is operated based on the program, and conducts the image formation onto the recording material; a sub-host having the second memory section to store the program; a user network to connect the image forming apparatus to the sub-host; a program administrating system having the control memory section in which the rewrite program of the image forming apparatus is stored; and a general network to connect the user network to the program administrating system, wherein the sub-host makes access to the program administrating system through the general network, obtains the rewrite program stored in the control memory section, stores it in the second memory section, and the image forming apparatus obtains the rewrite program stored in the second memory section, through the user network, and rewrites the program stored in the first memory section to the rewrite program.

(4) In an image forming apparatus which has the rewritable memory section in which the program is stored, and is operated based on the program, and conducts the image formation onto the recording material, the image forming apparatus is an image forming apparatus which obtains the rewrite program through the connected network, and when the image forming apparatus conducts the image formation, the obtaining of the rewrite program through the network is inhibited.

(5) In an image forming apparatus which has the rewritable memory section in which the program is stored, and is operated based on the program, and conducts the image formation onto the recording material, the image forming apparatus is an image forming apparatus which obtains the rewrite program through the connected network and stores it, and rewrites the program to the stored rewrite program, and when the image forming apparatus conducts the image formation, the rewriting of the program to the stored rewitable program is inhibited.

Further, the second object of the present invention can be attained by the following structures.

(6) In the remote administrating system having the controlled apparatus, the administrating apparatus to control the controlled apparatus, and the network to conduct the transmission and reception of the information between the controlled apparatus and administrating apparatus, when the information is transmitted from one of the controlled apparatus or administrating apparatus to the other, the memory apparatus to store the transmission information is provided, and the controlled apparatus or administrating apparatus to obtain the information makes access to the memory apparatus, and when the information exists in the memory apparatus, the information is obtained, and the interval to make access to the memory means is changeably provided.

(7) In the remote administrating system described in (6), after either one of the controlled apparatus or administrating apparatus transmits the transmission information to the other, or receives the transmission information from the other, the access interval of the one is reduced.

(8) In the remote administrating system described in (6) or (7), the controlled apparatus or administrating apparatus which obtains the transmission information causes to accumulate the reply information corresponding to the transmission information in the memory apparatus.

(9) In the remote administrating system described in any one of (6) to (8), after either one of the controlled apparatus or administrating apparatus obtains the reply information corresponding to the information from the other one, or after a predetermined time has passed after the information is transmitted to the other one, the access interval of the one is extended.

(10) In the remote administrating system described in any one of (6) to (9), the network has the user network to which the controlled apparatus is connected, service network to which the administrating apparatus is connected, and internet connected through the user network and service network, and the memory apparatus is connected to the user network or service network.

(11) In the remote administrating system described in any one of (6) to (10), the information is transmitted or received by an electronic mail, and the memory apparatus is a server to spool the electronic mail.

(12) In the remote administrating system described in any one of (6) to (11), the controlled apparatus is the image forming apparatus which forms the image onto the recording material.

(13) In the image forming apparatus which is connected to the administrating apparatus through the internet and user network, and is controlled by the administrating apparatus, and forms the image onto the recording material, a transmitting section to transmit the information to the administrating apparatus, an obtaining section which makes access to the user server which is connected to the user network and spools the electronic mail transmitted from the administrating apparatus at every predetermined interval, and obtains the information when the information is accumulated in the user server, and a control section to control the obtaining section so that the predetermined interval to make access to the user server is shortened, when the reply information from the administrating apparatus is sent by the electronic mail corresponding to the information transmitted by the transmitting section, or when the transmitting section transmits the information, are provided.

(14) In the administrating apparatus which is connected to the image forming apparatus to form the image onto the recording material, through the internet and service network, and which controls the image forming apparatus, the transmitting section to transmit the information to the image forming apparatus, the obtaining section which makes access to the service server which is connected to the service network and spools the electronic mail transmitted from the image forming apparatus at every predetermined interval, and obtains the information when the information is accumulated in the service server, and the control section to control the obtaining section so that the predetermined interval to make access to the service server is shortened, when the reply information from the image forming apparatus is sent by the electronic mail corresponding to the information transmitted by the transmitting section, are provided.

(15) In the remote administrating system having the controlled apparatus, and the administrating apparatus to control the controlled apparatus, and the network to conduct the transmission and reception of the information between the controlled apparatus and the administrating apparatus, when the information is transmitted and to the controlled apparatus or the administrating apparatus, as the attached file of the electronic mail, the binary file is encoded and transmitted.

(16) In the remote administrating system described in (15), to at least one of the text of the electronic mail and attached file, the ID information of the controlled apparatus or administrating apparatus is attached.

(17) In the remote administrating system described in (15) or (16), the network has the service network to which the administrating apparatus is connected, and the internet, and to the service network, the service server which spools the electronic mail, and a plurality of administrating apparatus are connected, and the service server selects the administrating apparatus to which the information is to be transmitted, according to the ID information of the administrating apparatus attached to the electronic mail transmitted from the controlled apparatus, and transmits the attached file to the selected administrating apparatus through the service network.

(18) In the remote administrating system described in any one of (15) to (17), the controlled apparatus is an image forming apparatus which forms the image onto the recording material.

(19) In the image forming apparatus which is connected to the administrating apparatus through the internet and the user network, and is controlled by the administrating apparatus, and forms the image onto the recording material, a file making section to make the file of the information to be transmitted to the administrating apparatus, and a transmission section by which the file made by the file making section, and the binary file are encoded, and the information is transmitted to the administrating apparatus as the attached file to the electronic mail, are provided.

(20) In the remote control section having the controlled apparatus, administrating apparatus to control the controlled apparatus, and network to conduct the transmission and reception of the information between the controlled apparatus and administrating apparatus, when the information is transmitted from the one of the controlled apparatus or administrating apparatus to the other, the memory apparatus to accumulate the transmitted information is provided, and the memory apparatus transmits the accumulated information to the controlled apparatus or the administrating apparatus, which obtains the information.

(21) In the remote administrating system described in (20), when the accumulated information is the emergency information, the memory apparatus transmits the accumulated information to the controlled apparatus or the administrating apparatus, which obtains the information.

(22) In the remote administrating system described in (20) or (21), the controlled apparatus or the administrating apparatus, which obtains the information, makes access to the memory apparatus, and when there is the information accumulated in the memory apparatus, obtains the information.

(23) In the remote administrating system described in any one of (20) to (22), the controlled apparatus is an image forming apparatus which forms the image onto the recording material.

BRIEF DESCRIPTION OF THE DRAWINGS

FIG. 14 is a sequence diagram showing the transmission and reception processing of the electronic mail and reply mail between the image forming apparatus and the administrating apparatus, when the communication event is generated, of the embodiment 6 of the present invention.

DETAILED DESCRIPTION OF THE PREFERRED EMBODIMENT

Figure 1:
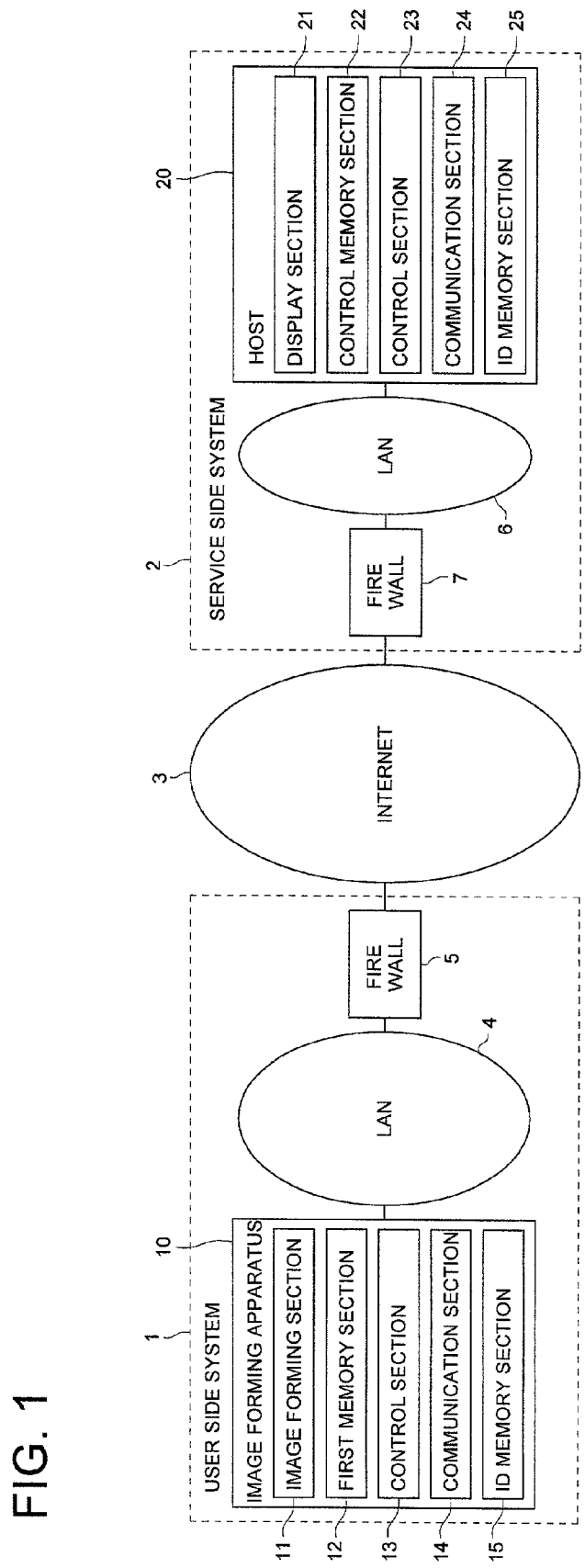
FIG. 1 is a block diagram showing the entire structure of an image forming system of the present invention.

Prior to the description of the embodiment of the present invention, according to FIG. 1 which is a block diagram showing the entire structure of an image forming system to attain the first object, the entire structure of the image forming system will be described below.

The image forming system is structured by a user side system 1, service side system 2, and internet 3 which is a network connected for sending and receiving of the information of an image forming apparatus 10 between the user side system 1 and service side system 2.

The user side system 1 can send and receive the information by the image forming apparatus 10 and a local area network (hereinafter, called also a LAN 4) which is a user side network to which the image forming apparatus 10 is connected, to and from each other. The LAN 4 is a network different from the internet 3, but is connected to the internet 3. In order to make this connection, by using a fire wall 5 to limit the passing information, the unfair invasion from the internet 3 is blocked.

The image forming apparatus 10 is an apparatus by which the image is formed on the recording material, and is connected to the internet 3 through the LAN 4 and fire wall 5. This image forming apparatus 10 has an image forming section 11, the first memory section 12, control section 13, communication section 14 and ID memory section.

The image forming section 11 is a section to conduct the image formation onto the recording material, and various image forming engines are used, and for example, an engine such as an ink jet system or electrophotographic system can be used, however, because these are well known, the description is omitted herein. In this connection, as the image forming section 11, not only the image forming section main body to conduct the image formation onto the recording material, but an image reading section to read the image data of a document, automatic document conveyance section to automatically convey the document in order to read the document, or post processing section to conduct the post processing (sorting or stapling) of the image formed recording sheet, may also be provided. In this connection, the automatic document conveyance section or post processing apparatus can be added by the user's desire as options of the image forming section 11.

The first memory section 12 is a rewritable memory section in which each kind of programs are stored, such as, for example, a flash memory. As the program stored in the first memory section 12, there is a program to conduct the control of the image forming section 11, for example, a program to conduct the control of the image forming section main body, image reading section, or the sequence control of the post processing apparatus, or an image processing program to process the read-out image information, image writing program to conduct the image writing processing, program to control the communication section 14, or program to control a display section to conduct the display of the condition or setting of the image forming apparatus 10, not shown, or program to control a setting section (operation section) to set the image forming condition. Then, because the first memory section 12 is rewritable, the program stored in the first memory section 12 can be respectively rewritten to rewrite program. For this rewriting, the image forming apparatus 10 itself conducts it according to a predetermined program, and this predetermined program is stored in the first memory section 12.

The control section 13 is a control section to control the image forming apparatus 10 according to each kind of program stored in the first memory section. Further, the communication section 14 is a section by which the sending and receiving of the information in the LAN 4, or the communication of the sending and receiving of the information through the LAN 4 and fire wall 5 to or from the internet 3 is conducted. The ID memory section 15 is a memory section to store each kind of ID information. As the ID information stored in the ID memory section 15, there are each program information stored in the first memory section (there are the date information at which the program is made, data information at which the program is stored, version information of the program, kind of the program, history information of the program, or information of the kind of machine of the image forming apparatus to specify the kind of machine of the image forming apparatus 10), and the ID information (serial number) of the image forming apparatus to uniquely specify the image forming apparatus 10, and the information of a host 20 in the service side system 2 to control the image forming apparatus 10, and a password to authorize when the communication is conducted to the host 20.

Of course, a serial number to uniquely specify each kind of apparatus (for example, the automatic document conveyance section or post processing section) added to the image forming apparatus 10 as options, can also be stored.

The LAN 4 is an information communication network provided on the user side, and to the LAN 4, not only the image forming apparatus 10, but the other image forming apparatus or a personal computer by which the image data is transmitted in order to form the image by the image forming apparatus 10, is also connected. Then, to the LAN 4, the internet 3 is connected, and the fire wall 5 to limit the passing information is connected.

The service side system 2 has the host 20 which is an administrating apparatus, a local area network 6 (hereinafter, called also the LAN 6) which is a network on the service side to which the host 20 is connected, and a fire wall 7 to connect the LAN 6 to the internet 3 and to limit the passing information. This service side system 2 is, in the present embodiment, also a program administrating system to control the rewrite program of the program stored in the first memory section 12 of the image forming apparatus 10.

The host 20 is the administrating apparatus to control the image forming apparatus 10 (the other plurality of image forming apparatus), and connected to the internet 3 through the LAN 6, and the fire wall 7. In more detail, this host 20 grasps the condition of the image forming apparatus controlled by the host 20, in the present embodiment, by controlling the condition (version) of the program of the image forming apparatus, grasps the condition of the image forming apparatus. This host 20 has a display section 21, control memory section 22, control section 23, communication section 24 and ID memory section 25.

The display section 21 is a display section on which the condition of the image forming apparatus is displayed in order to grasp the condition of the image forming apparatus. That is, when the service man on the service side watches the display, the service man can grasp that which image forming apparatus installs which version program. Of course, as will be described later, when the image forming apparatus renews the program, and also when the setting is conducted, this display section 21 is utilized, and the setting is conducted from the operation section, not shown.

The control memory section 22 is a memory section in which a version-upped edition of each kind of program of the image forming apparatus, or bug corrected rewrite program is stored, for example, the flash memory. As the rewrite program stored in the control memory section 22, it is the rewrite program of each kind of program stored in the first memory section 12, and is appropriately stored by the service side.

The control section 23 is a control section to control the host 20. Further, the communication section 24 is a section by which the sending and receiving of the information in the LAN 6, or the communication of the sending and receiving of the information through the LAN 6 and fire wall 7 to or from the internet 3 is conducted. The ID memory section 25 is a memory section to store each kind of ID information. As the ID information stored in the ID memory section 25, there are not only the information of the host 20 (a serial number to uniquely specify the host 20), password to be authorized when the communication with the image forming apparatus 10 is conducted, and serial number of the image forming apparatus to be controlled by the host 20, but also the rewrite program information stored in the control memory section 22 (there is the date information at which the program is made, date information at which the program is stored, version information of the program, history information of the program, or information of the kind of machine of the image forming apparatus to specify the kind of machine of the image forming apparatus which is a target to be rewritten).

The LAN 6 is a information communication network provided on the service side, and to the LAN 6, not only the host 20, but the other host is also connected. Then, the LAN 6 is a service network different from the internet 3, but, connected to the internet 3. In order to conduct this connection, by using the fire wall to limit the passing information, the undesirable invasion from the internet 3 is blocked.

In the image forming system structured as above, the procedure of rewriting of each kind of programs stored in the first memory section 12 of the image forming apparatus 10 will be described below. In this connection, prior to the procedure of the following description, in the service side system 2, the rewrite program is already stored in the control memory section 22, and further, the information of the rewrite program is already stored in the ID memory section 25.

(Embodiment 1)

Figure 2:
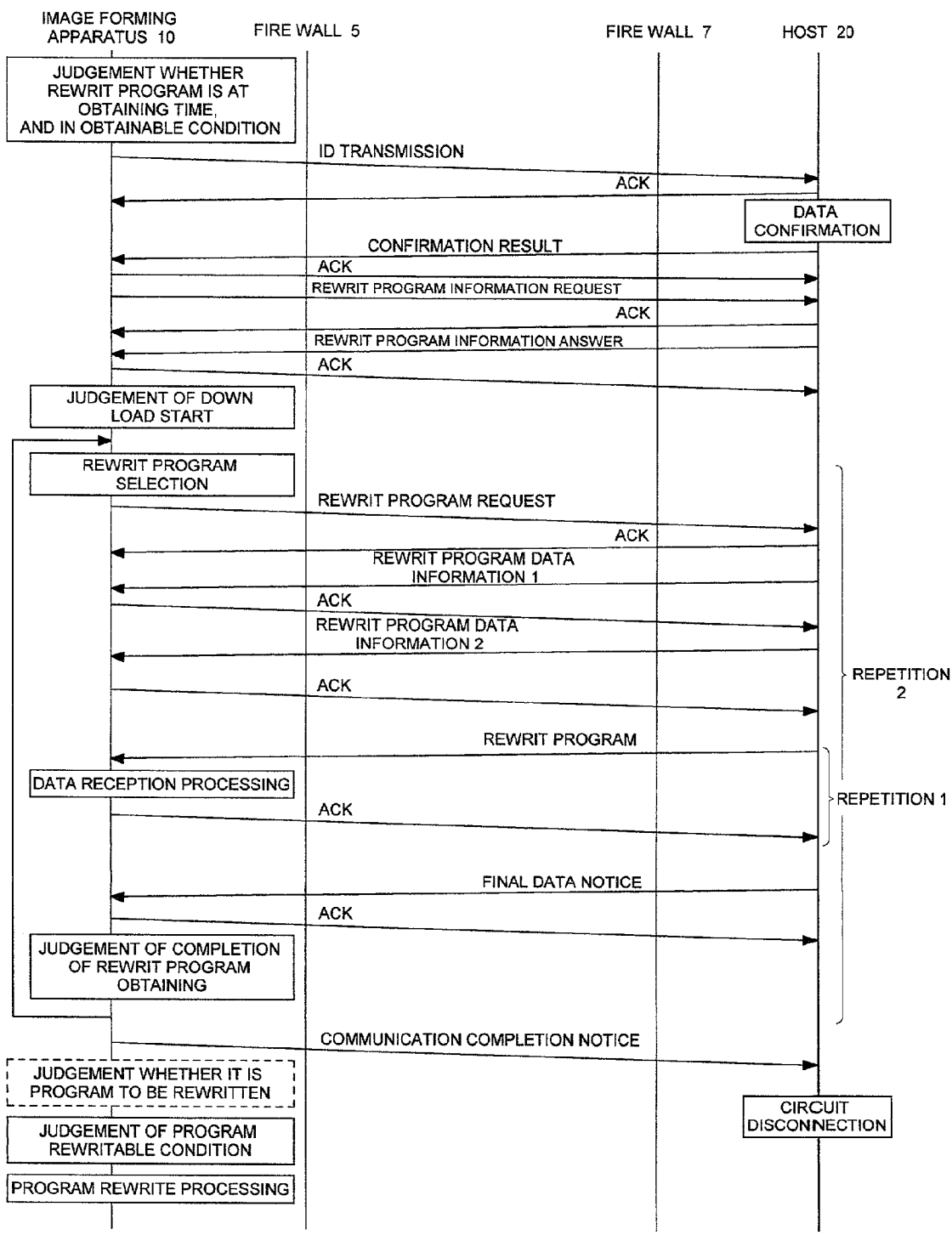
FIG. 2 is a flow chart showing the rewriting procedure of the rewrite program of the embodiment 1 of the present invention.

Initially, referring to FIG. 2 which is a flow chart showing the rewriting procedure, the rewriting procedure when the passing information is severely limited by the fire wall, will be described. In the embodiment, the image forming apparatus itself makes access to the host 20, and obtains the rewrite program.

Initially, the image forming apparatus 10 judges whether the rewrite program is at the obtaining time, and whether it is in the obtainable condition. Herein, the judgment of the obtaining time is the judgment whether the program reaches a predetermined date and time (time) (whether the predetermined time has passed) or (whether the image formation of a predetermined number of sheets is conducted), in other words, the image forming apparatus 10 periodically makes access to the host 20 and periodically confirms whether the rewrite program of its own exists, as will be described later. Further, the judgment whether the rewrite program is in obtainable condition, is, for example, because the communication section 14 is used for obtaining, the judgment whether the communication section 14 is ready (the other operation is not conducted) (when ready, it is in the obtainable condition), further, when down load is conducted, because the memory of the operation area of the CPU which is the control section 13, is used, the judgment whether the memory is ready, further, for down-loading, because the large burden is loaded on the control section 13, the judgment whether the image forming apparatus 10 is in the image formation (when not in the image formation, it is in the obtainable condition).

Then, when the rewrite program is at the obtaining time, and in a obtainable condition, the image forming apparatus sets the transmission destination according to the information of the host 20 which is stored in the ID memory section 15, and which controls the image forming apparatus 10, and through the LAN 4, fire wall 5, internet 3, fire wall 7, and LAN 6, transmits the ID information (serial number) or password of the image forming apparatus stored in the ID memory section 15, to the host 20. When the host 20 receives the ID information transmitted from the image forming apparatus 10, the host 20 replies the normal reception signal (ACK) showing that the information is normally received, to the image forming apparatus 10. Of course, in the image forming apparatus 10, when the ACK is not received, it is judged that the transmission is failed, and the information is transmitted again (this transmission failure is also applied for the case of any information transmission after that, therefore, hereinafter, the explanation will be neglected).

In the host 20, it is judged for the transmitted data confirmation, whether the ID information and the password of the image forming apparatus 10 received from the image forming apparatus are correct, or whether it is the image forming apparatus controlled by the host itself, from the information stored in the ID memory section 25. Then, the data confirmation is completed, and the confirmation result is replied to the image forming apparatus 10 as the answer to the ID transmission. In the image forming apparatus 10, when the confirmation result is received, in the case of normal reception, the ACK is answered to the host 20.

Successively, the image forming apparatus 10 transmits the rewrite program information request to require the information of the rewrite program stored in the control memory section 22 of the host 20 to the host 20. When the host 20 receives the rewrite program information request, in the case of the normal reception, the ACK is answered to the image forming apparatus 10. Then, as the response to this request, the host 20 replies the information of the rewrite program stored in the control memory section 22 at that time point (that is, the information of the rewrite program stored in the ID memory section 25), as the rewrite program information answer, to the image forming apparatus 10. In the case where the image forming apparatus 10 receives this rewrite program information answer, when it is received normally, the ACK is answered to the host 20.

Then, the image forming apparatus 10 judges whether, from the received information of the rewrite program, and the program information of itself stored in the ID memory section 15, the version up edition or bug correction edition of the program of itself exists in the host 20, that is, whether it is necessary that the rewrite program is down-loaded. For this judgment, it is judged whether the rewrite program is newer than the program of itself, according to the program information corresponding to the program of itself (at that time point) (the date at which the program is made, stored date, version information, history information, information of the kind of machine of the image forming apparatus) and the rewrite program information corresponding to the rewrite program (the date at which the program is made, stored date, version information, history information, information of the kind of machine of the image forming apparatus).

When the image forming apparatus judges that down load is necessary, initially, the rewrite program is selected (as the program, because there are a plurality of programs as described above, the program which is necessary to be written is not limited to only one). When selected, the image forming apparatus 10 transmits the rewrite program request which requires to transmit the selected rewrite program, to the host 20. In the case where the host 20 receives this rewrite program request, when the request is normally received, the ACK is answered to the image forming apparatus 10. Then, the host 20 replies as the response to the rewrite program request, initially, the rewrite program data information 1 such as the quantity (data length) of the data of the rewrite program to the image forming apparatus together with the rewrite program ID. In the case where the image forming apparatus 10 receives this rewrite program information 1, when the information is normally received, the ACK is answered to the host 20. In this connection, when the data quantity (the whole quantity of one rewrite program) exceeds the receivable size on the image forming apparatus 10 side, the NACK (rejection) information is replied and the communication is ended, or the next rewrite program is obtained. When the host 20 receives the ACK, the host 20 succeedingly replies the rewrite program data information 2 which is the information relating to the transmission method such as the transferred block information and the compression information, as the response to the rewritble program request, together with the rewrite program ID, to the image forming apparatus 10. In the case where the image forming apparatus 10 receives this rewrite program information 1, when the information is normally received, the ACK is answered to the host 20.

When the host 20 receives this ACK, as the response to the rewrite program request, the host 20 actually replies the rewrite program to the image forming apparatus 10. At this time, in order to reply by the transmission method shown in the rewrite program data information 2, that is, in order to reply for each block unit, in the image forming apparatus 10 which received the information, it is stored in the memory, and the apparatus 10 conducts the data reception processing of the received data such as the combination of a plurality of blocks, or the answer of the compression. Of course, when the image forming apparatus receives the rewrite program, the apparatus answers the ACK at every received time to the host 20 when the program is normally received, and when the host 20 receives the ACK, the host sends the next block.

As described above, the image forming apparatus 10 repeats the receiving of the rewrite program and the data reception processing until the data corresponding to the data quantity shown in the rewrite program data information 1 is processed (in the drawing, the repetition 1). Then, in the host 20, when the reply of the final block is completed, the host 20 replies the final data notice to the image forming apparatus 10. In the case where the image forming apparatus receives the final data notice, when the notice is normally received, the ACK is answered to the host 20.

The image forming apparatus 10 which answered the ACK to the host 20, conducts the rewrite program obtaining completion judgment. That is, it judges whether it is necessary to down load another rewrite program, and when it is necessary to down load another rewrite program, it returns to the rewrite program selection, and repeats the repetition 2 in the drawing until it becomes not necessary to down load the rewrite program.

On the one hand, when the image forming apparatus 10 judges that the rewrite program obtaining has been completed, it sends the communication completion notice to the host 20. The host 20 receives this signal, and disconnects the circuit to the image forming apparatus 10.

The image forming apparatus 10 which sent the communication completion notice to the host 20, judges whether the down-loaded (transmitted (replied) corresponding to the request of the transmitting address) rewrite program is the true rewrite program, and further whether the down-loaded rewitable program is correctly down loaded, according to the rewrite program information or the rewrite program data information 1.

After that, the image forming apparatus 10 judges the program rewritable condition. This judgment is conducted in such a manner that, when the program is rewritten, it is judged at least whether the program to be written is used, (when not used, it is in the rewritable condition), and in order to rewrite the program more safely, because the memory to be used as the working area of the CPU which is the control section 13, is used for rewriting, it is judged whether this memory is empty (when empty, it is in the rewritable condition), and whether the image forming apparatus 10 is image forming now-(when not image forming, it is in the rewritable condition). Then, when it is judged as the rewritable condition, the image forming apparatus 10 itself rewrites the program to the rewrite program according to a predetermined program.

(Embodiment 2)

Figure 3:
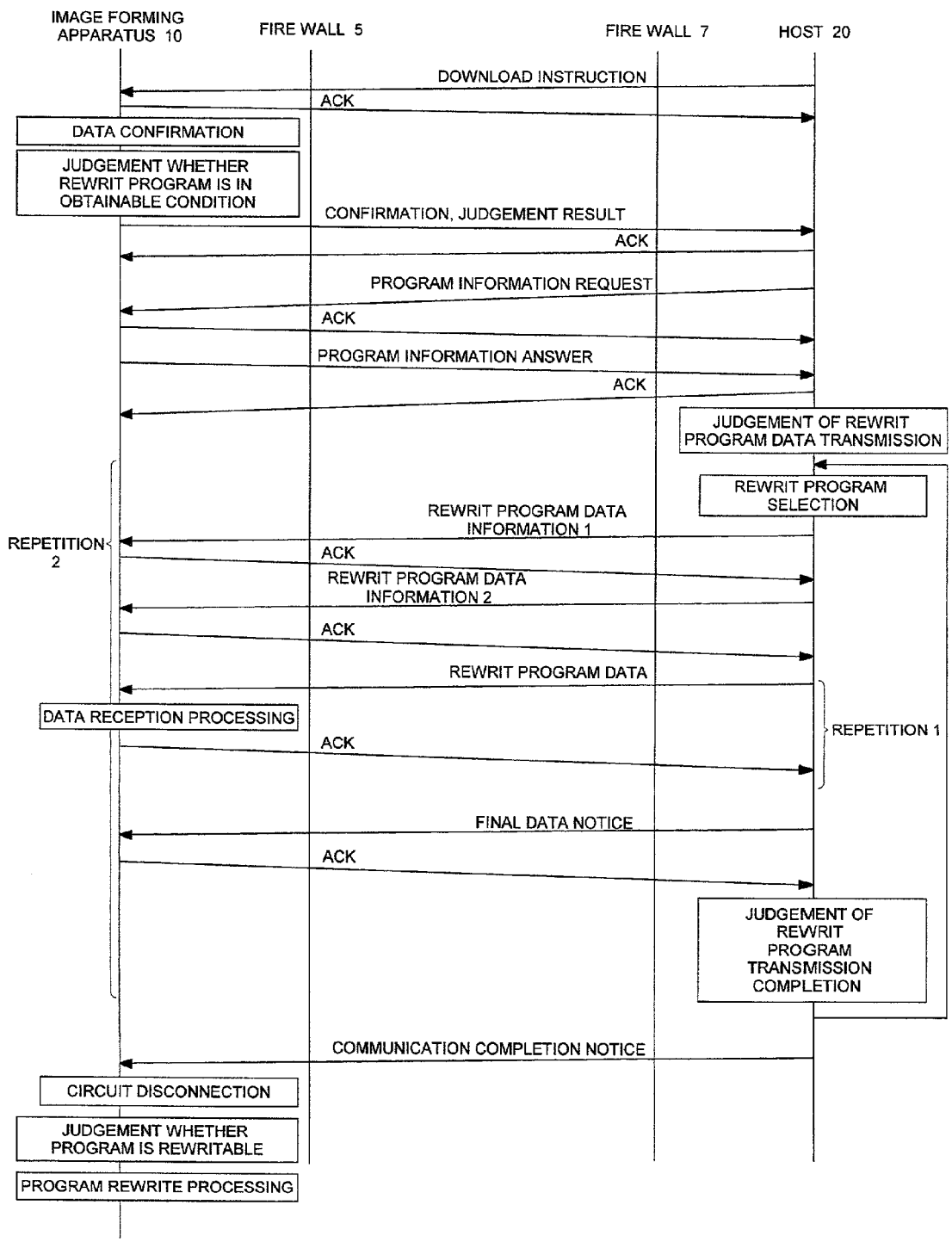
FIG. 3 is a flow chart showing the rewriting procedure of the rewrite program of the embodiment 2 of the present invention.

Next, according to FIG. 3 which is a flow chart showing the rewriting procedure, the embodiment 2 will be described. In the above embodiment 1, the image forming apparatus 10 itself makes access to the host 20 and obtains the rewrite program, however, in the present embodiment 2, from the host 20 side to the image forming apparatus 10, the rewriting to the rewrite program is instructed. In this connection, hereinafter, the description of the procedure which is the same as in the above embodiment 1 will be sometimes neglected.

Initially, when the rewrite program is stored in the control memory section 22, the host 20 gives the instruction to down-load (down load instruction) the rewrite program to the image forming apparatus (herein, the image forming apparatus 10) which is the target of the rewrite program. At this time, with this down load instruction, the ID information, password, and the information of the host 20 of the image forming apparatus 10 which is the target, are transmitted together. In the case where the image forming apparatus 10 receives this down load instruction, when the instruction is normally received, the ACK is answered to the host 20.

Then, the image forming apparatus 10 judges and conducts the data confirmation collating it with the information stored in the ID memory section 15, whether the host is the host 20 to control the image forming apparatus 10, from the transmitted password and information of the host 20, or whether the type of the machine as the target machine is matched, from the ID information of the image forming apparatus 10. Further, the image forming apparatus 10 judges whether the rewrite program is in the obtainable condition. Then, the results of these confirmation-judgment are transmitted to the host 20. In the case where the host 20 receives the results of these confirmation-judgment, when these are normally received, the ACK is answered to the image forming apparatus 10.

When the apparatus matches as the kind of the machine of the target machine, and the rewrite program is in the rewritable condition from the received result of the confirmation-judgment, the host 20 transmits the program information request so that the information of the program (present program) stored in the first memory section 12 is transmitted to the host 20, to the image forming apparatus 10. In the case where the image forming apparatus 10 receives this program information request, when the request is normally received, the image forming apparatus 10 answers the ACK to the host 20. Then, the image forming apparatus 10 transmits, as the information of the program, the each kind of program information stored in the ID memory section 15 to the host 20, as the program information answer. In the case where the host 20 receives the program information answer, when it is normally received, the host 20 answers the ACK to the image forming apparatus 10.

The host 20 judges whether it is necessary that the rewrite program is transmitted to the image forming apparatus 10, (that is, whether it is necessary that the program of the image forming apparatus 10 is rewritten), from the program information transmitted from the image forming apparatus 10, and the rewrite program information stored in the ID memory section 25. When the image forming apparatus 10 judges that the transmission is necessary, initially, the rewrite program is selected. Then, the host 20 transmits at first the rewrite program data information 1 such as the data quantity of the rewrite program, to the image forming apparatus 10 together with the rewrite program ID. In the case where the image forming apparatus 10 receives the rewrite program data information 1, when it is normally received, the image forming apparatus 10 answers the ACK to the host 20. When the host 20 receives the ACK, succeedingly, transmits the rewrite program data information 2 which is the information relating to the transmission method such as the transfer block information, or the compression information, to the image forming apparatus 10 together with the rewrite program ID. In the case where the image forming apparatus 10 receives this rewrite program data information 1, when it is normally received, the image forming apparatus 10 answers the ACK to the host 20.

When the host 20 receives this ACK, the host 20 actually transmits the rewirtable program to the image forming apparatus 10. In this case, in order to transmit by the transmission method shown in the rewrite program data information 2, the image forming apparatus 10 which received the program, conducts the data reception processing. Of course, in the case where the image forming apparatus 10 receives the rewrite program, at every reception, when it is normally received, the apparatus 10 answers the ACK to the host 20, and when the host 20 receives this ACK, the next block is sent.

As described above, in the image forming apparatus 10, the reception of the rewrite program and the data reception processing are repeated until the data corresponding to the data quantity shown in the rewrite program data information 1 is processed (in the drawing, the repetition 1). Then, in the host 20, when the transmission of the final block is completed, the final data notice is transmitted to the image forming apparatus 10. In the case where the image forming apparatus receives the final data notice, when it is normally received, the ACK is answered to the host 20.

The host 20 which received the ACK, conducts the rewrite program transmission completion judgment. When the transmission is necessary, the sequence returns to the rewrite program selection, and the repetition 2 in the drawing is repeated until the transmission becomes unnecessary. On the one hand, when the host 20 judges the rewrite program transmission completion, the host 20 transmits the communication completion notice to the image forming apparatus 10. When the image forming apparatus 10 receives this signal, the apparatus 10 disconnects the circuit to the host 20.

The image forming apparatus 10 which received the communication completion notice, judges whether the obtained rewrite program is correctly down loaded, according to the rewrite program information or rewrite program data information 1. Then, the image forming apparatus 10 judges whether the program is in the rewritable condition. Then, when it is judged to be in the rewritble condition, the image forming apparatus 10 itself rewrites the program to the rewrite program according to a predetermined program.

Figure 4:
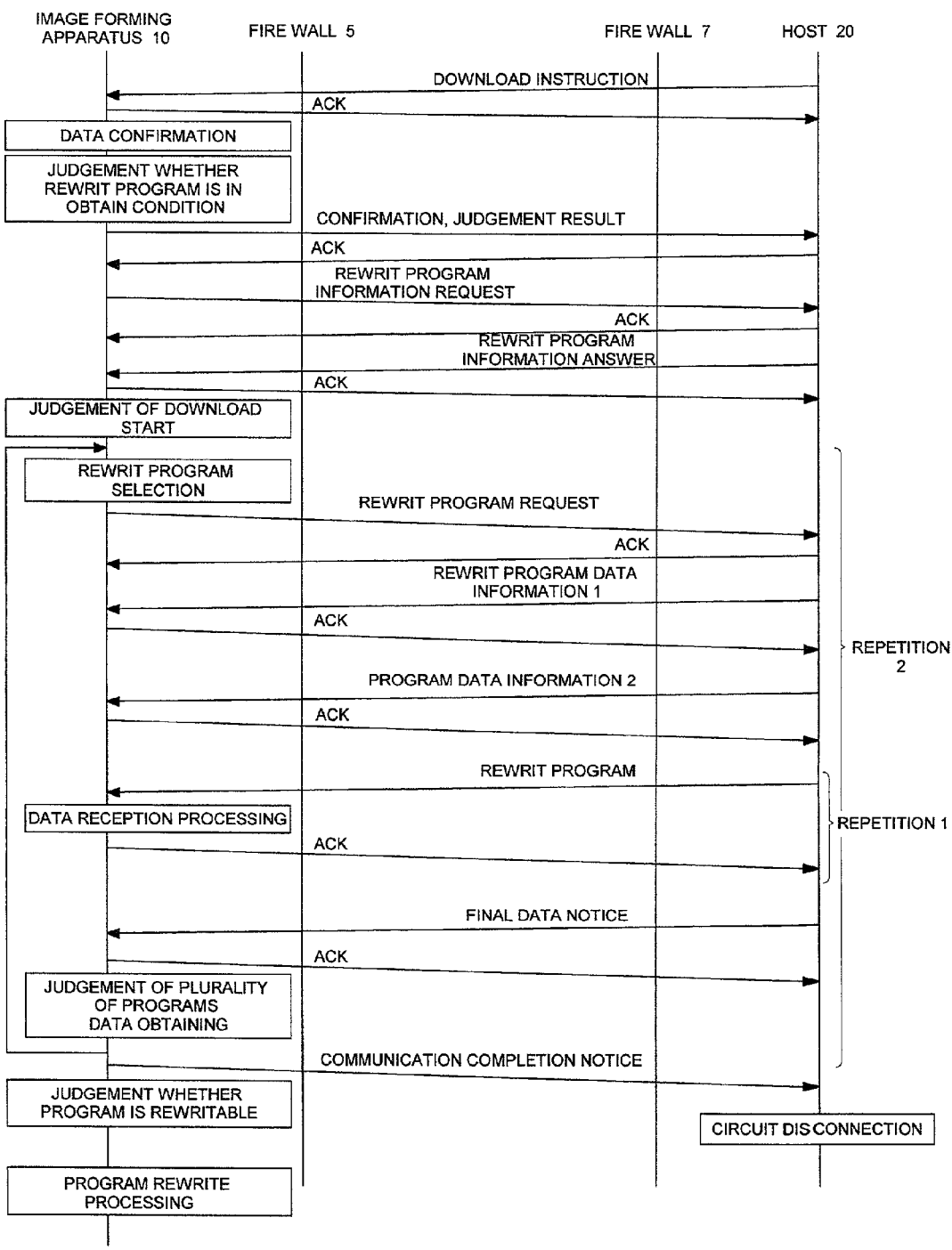
FIG. 4 is a flow chart showing the rewriting procedure in which the image forming apparatus is described as a main, of the rewrite program of the embodiment 2 of the present invention.
Figure 5:
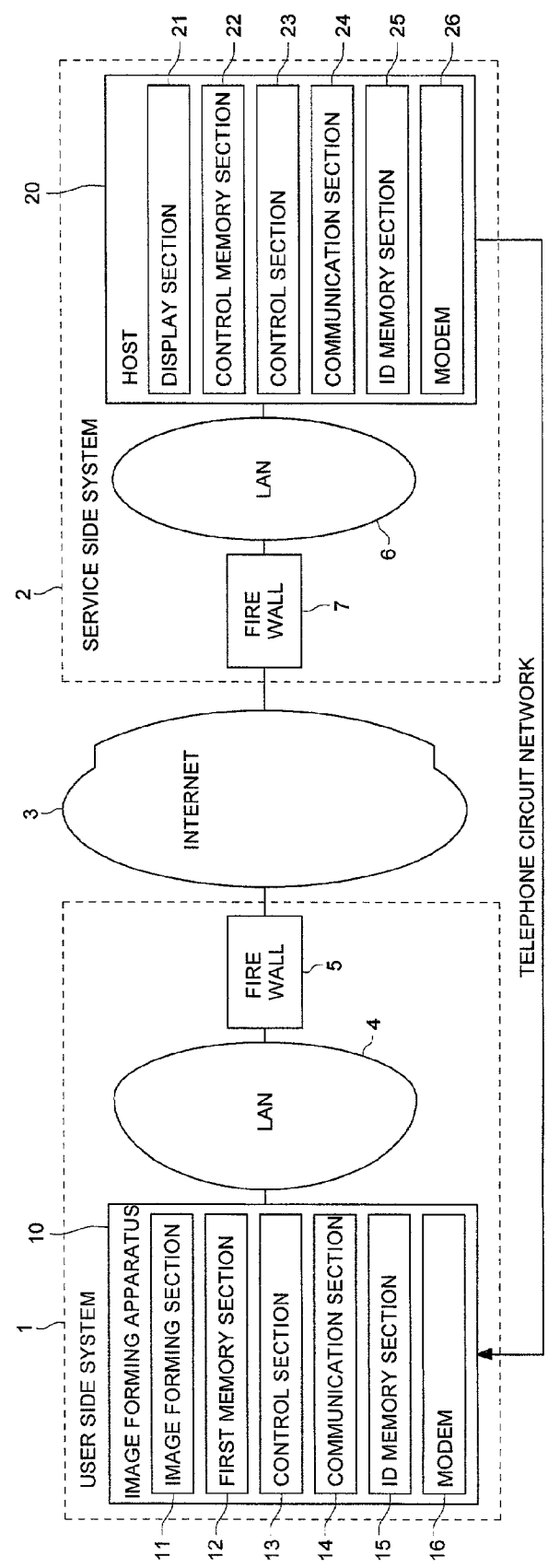
FIG. 5 is a block diagram showing the entire structure of an image forming system of the embodiment 3 of the present invention.

In this connection, the present embodiment 2 is the instruction leading type from the host 20, that is, the transmission of the information is basically on the host 20 side, and the selection of the rewrite program to be transmitted is conducted also on the host 20 side, however, as in the embodiment 1, the operations subsequent to the down load instruction from the host 20, (specifically describing, the program information request in FIG. 4 is conducted as the rewrite program information request from the image forming apparatus 10 side, and the operations subsequent to this) may also be conducted by the leadership of the image forming apparatus 10. In this connection, because the description according to FIG. 5 is duplicated with the above embodiment 1 and embodiment 2, herein, it is omitted.

(Embodiment 3)

In the above embodiment 2, because the down load instruction is transmitted from the host 20 to the image forming apparatus 10 through the internet 3, in the case where the limitation of the information passing through the fire wall 5 is severe, it is difficult that even such the down load instruction passes. Therefore, when the system is structured in the manner that the present embodiment, the problem can be solved.

Figure 6:
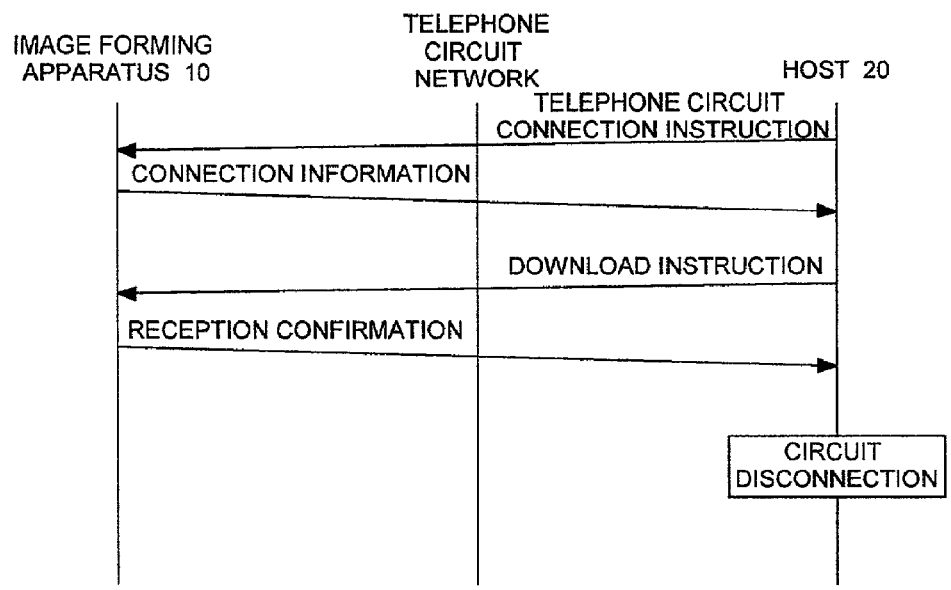
FIG. 6 is a flow chart showing the procedure of a download instruction of the embodiment 3 of the present invention.
Figure 7:
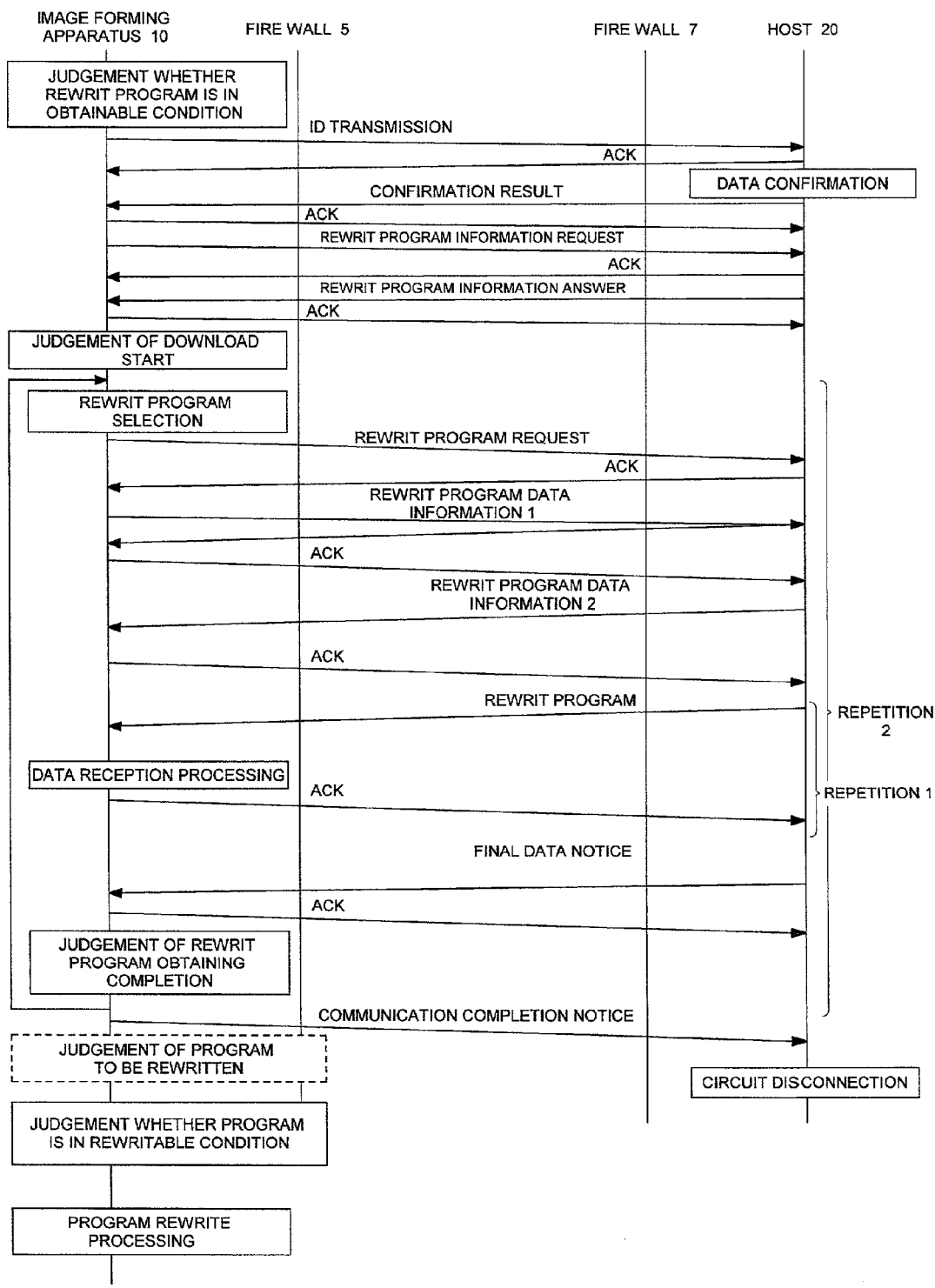
FIG. 7 is a flow chart showing the procedure subsequent to the time when the download instruction is received, of the embodiment 3 of the present invention.

The embodiment 3 will be described below. FIG. 5 is a block diagram showing the whole structure of the image forming system, and FIG. 6 is a flow chart showing the procedure of the down load instruction. Further, FIG. 7 is a flow chart showing the rewriting procedure subsequent to reception of the instruction.

In this connection, FIG. 5 is basically the same (the same reference numerals and signs are given to the same functions-sections) as the block diagram in FIG. 1, and only the different point will be described below, and because the other points are the same as in FIG. 1, the description will be neglected.

In FIG. 5, a modem 16 is added to the image forming apparatus 10, and a modem 26 is added to the host, which are different points from FIG. 1. These modems 16 and 26 are connected to the telephone circuit network (the network different from the internet 3) which is a public telecommunication circuit, and the digital signal is converted to the analog signal. That is, the image forming apparatus 10 and the host 20 can be in a condition connected in P to P. In this connection, it is preferable that these modems 16 and 26 are respectively directly provided to the image forming apparatus 10 and the host 20, however, a modem is provided in each LAN, and it may be preferable when the image forming apparatus 10 and the host 20 are in a directly communicable condition with each other.

Next, according to FIG. 6 which is a flow chart showing the procedure of the down load instruction as a portion of the rewriting procedure, the applying method of the down load instruction for the rewriting procedure of the present embodiment 3 will be described.

Initially, when the rewrite program is stored in the control memory section 22, the host 20 makes the call origination from the host 20 to the image forming apparatus (herein, the image forming apparatus 10) which is a target of the rewrite program, by using the modem 26 in the telephone circuit network, and starts the communication (makes a call). Then, the image forming apparatus 10 which received the call, returns, as the connection information, the connection information to confirm the communication configuration to the host 20. In this connection, these telephone circuit connection instruction and the connection information correspond to the negotiation in the communication using the telephone circuit.

When the negotiation is completed, the host 20 gives the instruction to down load (down load instruction) to the image forming apparatus 10. In this case, the down load instruction is replied together with the ID information of the objective image forming apparatus 10, password, and the information of the host 20. In the case where the image forming apparatus 10 receives the down load instruction, when it is normally received, the apparatus 10 answers the reception confirmation (in the above embodiment, the ACK) to the host 20. When the host 20 receives it, the host 20 disconnects the telephone circuit.

Referring to FIG. 7, the rewriting procedure after that will be described below. In this connection, also in this description, for the same description as in the above embodiment 1, the description will be neglected sometimes.

As described above, the image forming apparatus 10 which received the down load instruction from the host 20 by a telephone circuit, through the modems 26 and 16, judges, after the disconnection of the telephone circuit, initially whether rewrite program is in the obtainable condition. Then, when the rewrite program is in the obtainable condition, the image forming apparatus transmits the ID information (serial number) or password of the image forming apparatus 10 stored in the ID memory section 15, to the host 20. When the host 20 correctly receives the ID information transmitted from the image forming apparatus 10, the host 20 answers the ACK to the image forming apparatus 10.

The host 20 judges the transmitted data confirmation whether the ID information and the password of the image forming apparatus 10 which are received from the image forming apparatus, are correct, or it is the image forming apparatus controlled by itself, from the information stored on the ID memory section 25. Then, the data confirmation is completed, and the confirmation result is replied to the image forming apparatus 10. In the case where the image forming apparatus receives the confirmation result, when it is normally received, the ACK is answered to the host 20.

Succeedingly, the image forming apparatus 10 transmits the rewrite program information request to the host 20. In the case where the host 20 receives the rewrite program information request, when it is normally received, the host 20 answers the ACK to the image forming apparatus 10. Then, the host 10 replies the information of the rewrite program stored in the control memory section 22 at the present time point, as the rewrite program information answer, to the image forming apparatus 10. In the case where the image forming apparatus 10 receives the rewrite program information answer, when it is normally received, the ACK is answered to the host 20.

Then, the image forming apparatus 10 judges whether the rewrite program of its own program is in the host 20, that is, whether the down load is necessary, from the information of the received rewrite program and its own program information stored in the ID memory section 15. When the image forming apparatus 10 judges that the down load is necessary, initially, it selects the rewrite program. When the selection is conducted, the image forming apparatus 10 transmits the rewrite program request to require so as to transmit the selected rewrite program, to the host 20. In the case where the host 20 receives the rewrite program request, when it is received normally, the host 20 answers the ACK to the image forming apparatus 10. Then, the host 20 initially replies the rewrite program data information 1 as the answer to the rewrite program request to the image forming apparatus 10 together with the rewrite program ID. In the case where the image forming apparatus 10 receives the rewrite program data information 1, when it is normally received, the ACK is answered to the host 20. When the host 20 receives the ACK, succeedingly, as the answer to the rewrite program request, the host 20 replies the rewrite program data information 2 to the image forming apparatus 10 together with the rewrite program ID. In the case where the image forming apparatus 10 receives the rewrite program data information 1, when it is normally received, the ACK is answered to the host 20.

When the host 20 receives the ACK, the host 20 actually transmits the rewrite program to the image forming apparatus 10. In this case, in order to transmit the program by the transmission method shown in the rewrite program data information 2, the image forming apparatus 10 which received the rewrite program, conducts the data reception processing. Of course, when the image forming apparatus 10 receives the rewrite program, at every reception time, when it is normally received, the ACK is answered to the host 20, and when the host 20 receives this ACK, the next block is sent.

As described above, the image forming apparatus 10 repeats the reception of the rewrite program and the data reception processing, until the data corresponding to the data quantity shown in the rewrite program data information 1 is processed (in FIG. 7, the repetition 1).

The, when the reply of the final block is completed, the host 20 replies the final data notice to the image forming apparatus 10. In the case where the image forming apparatus receives the final data notice, when it is normally received, the ACK is answered to the host 20. The image forming apparatus 10 which sends the ACK to the host 20 conducts the rewrite program obtaining completion judgment, and when the down load is necessary, the sequence returns to the rewrite program selection, and the repetition 2 in the drawing is repeated, until the down load becomes unnecessary.

On the one hand, when the image forming apparatus 10 judges that the rewrite program obtaining is completed, the image forming apparatus 10 transmits the communication completion notice to the host 20. When the host 20 receives this signal, the host 20 disconnects the circuit to the image forming apparatus 10.

The image forming apparatus 10 which transmits the communication completion notice to the host 20, judges whether the down loaded rewrite program is the rewrite program which may be actually rewritten, further, whether the down loaded rewrite program is correctly down loaded, according to the rewrite program information or rewrite program data information 1. After that, the image forming apparatus 10 judges that the program is in the rewritable condition. When it is judged that program is in rewritable condition, the image forming apparatus 10 itself rewrites the program to the rewrite program according to a predetermined program.

(Embodiment 4)

In the above embodiment 1, an example in which the image forming apparatus 10 directly makes access to the host 20, is described, however, the image forming apparatus 10 itself does not make access to host 20 and down load the rewrite program, but, the image forming apparatus 10 may indirectly down load the rewrite program. In the present embodiment 4, an example in which the image forming apparatus 10 itself indirectly down loads the rewrite program, will be described below.

Figure 8:
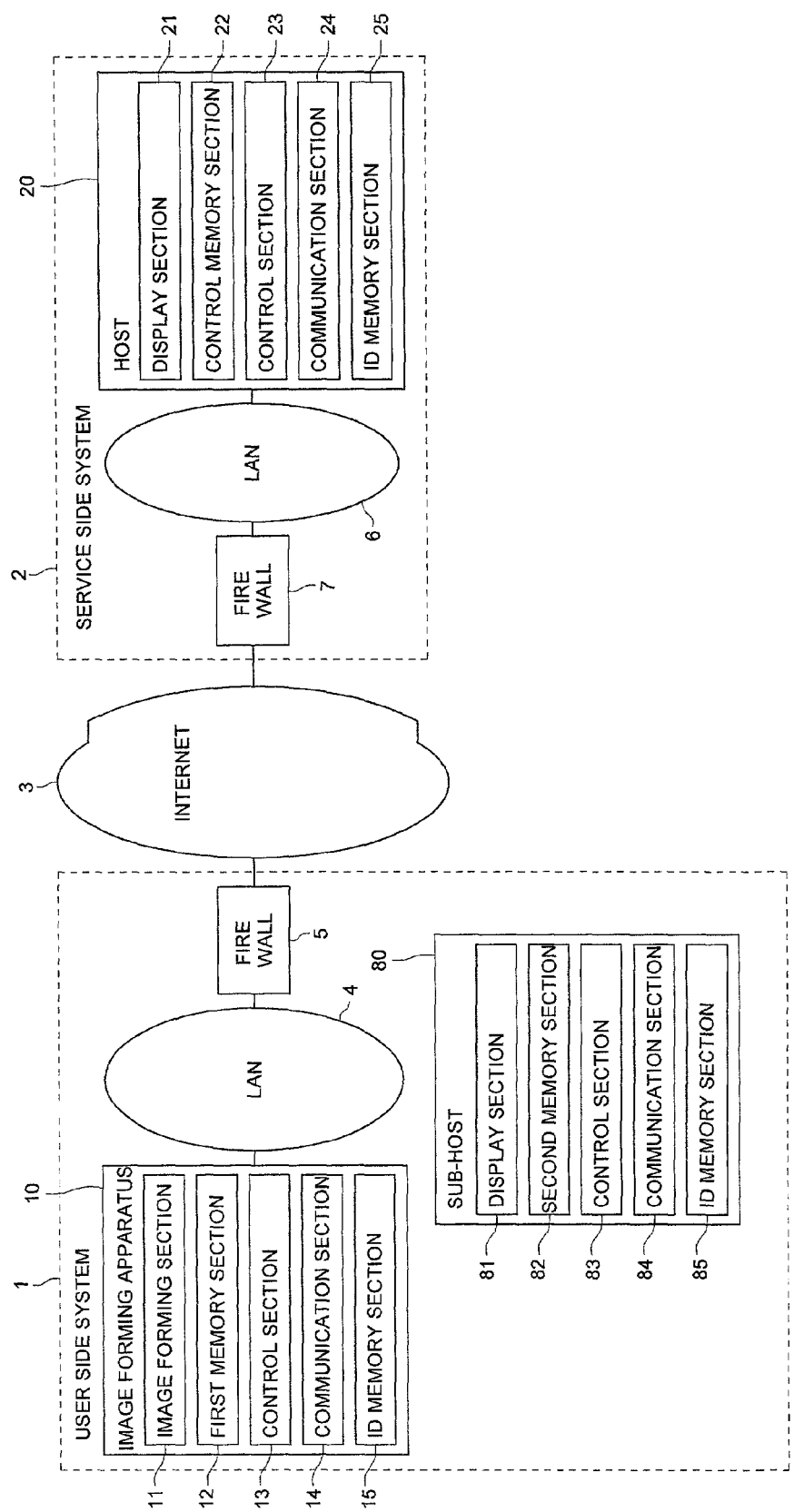
FIG. 8 is a block diagram showing the entire structure of an image forming system of the embodiment 4 of the present invention.
Figure 9:
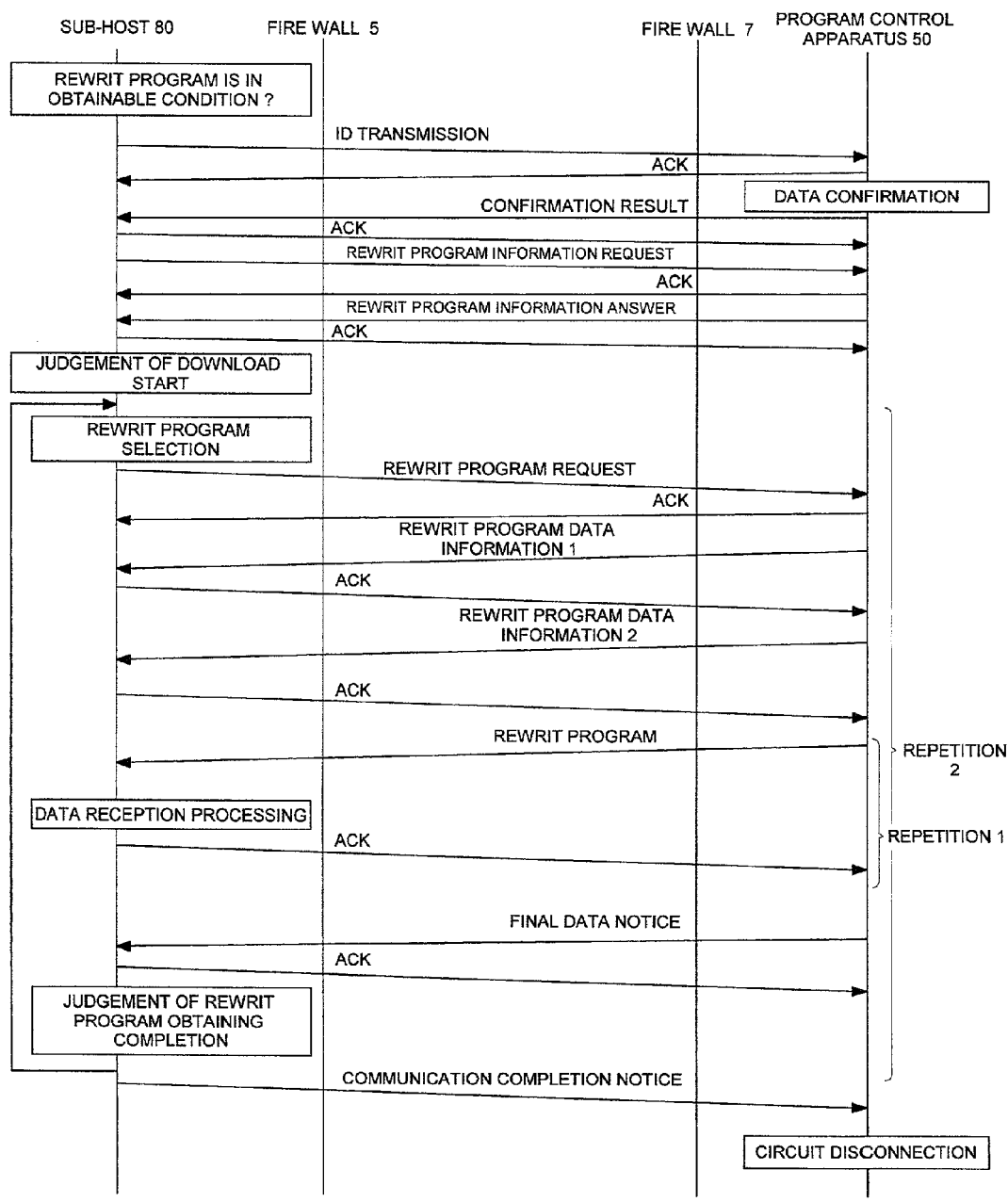
FIG. 9 is a flow chart showing the rewriting procedure of the rewrite program of the embodiment 4 of the present invention.
Figure 10:
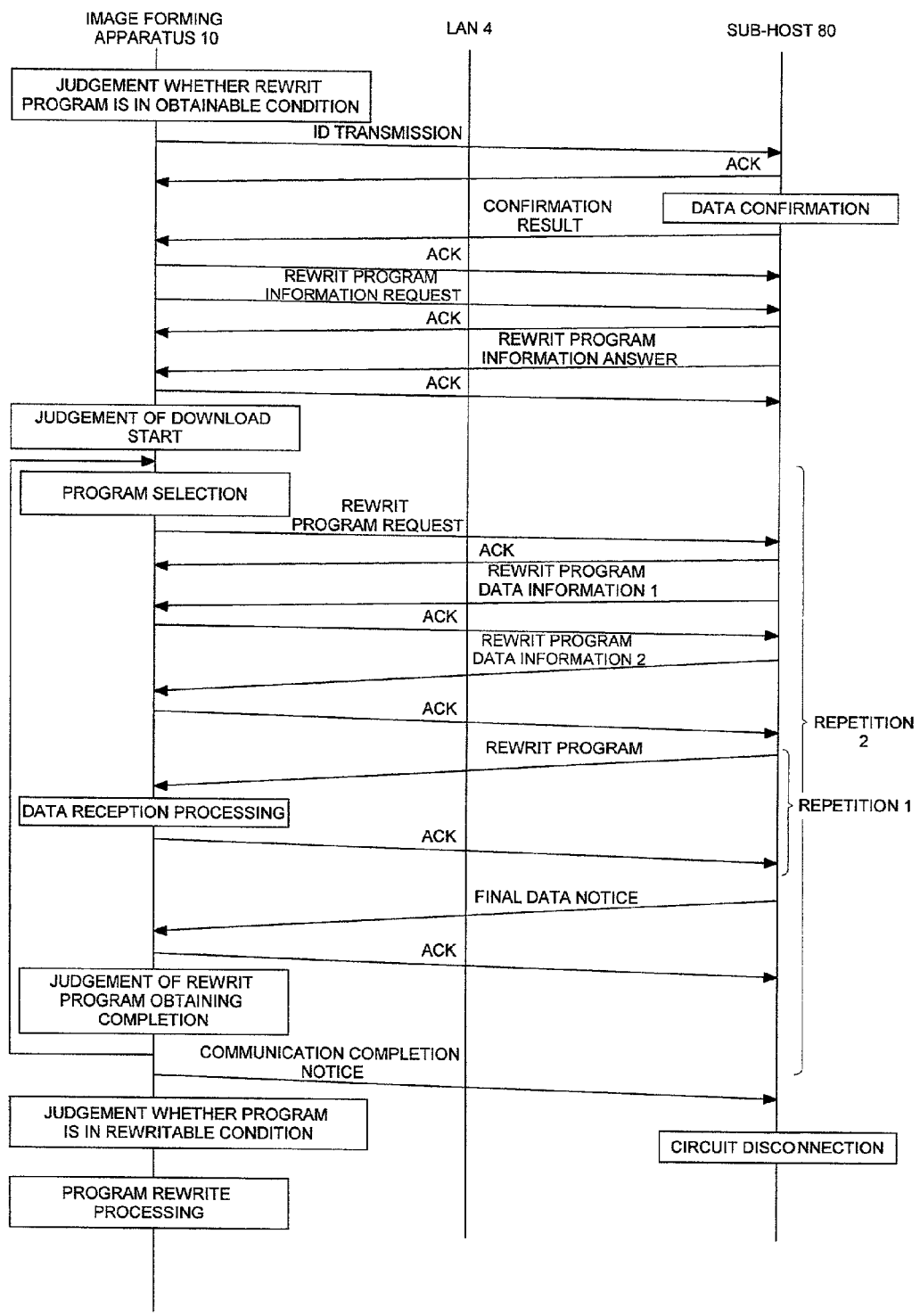
FIG. 10 is a flow chart showing the rewriting procedure of the rewrite program of the embodiment 4 of the present invention.

FIG. 8 is a block diagram showing the whole structure of the image forming system. Further, FIG. 9 and FIG. 10 are flow charts showing the rewriting procedure. In this connection, FIG. 8 is basically the same (the same reference numerals and signs are denoted to the same function and section) as the block diagram in FIG. 1, and only the different point will be described below, and because the other points are the same as FIG. 1, the explanation will be neglected (even when it is given the same code, the point described below is different).

In the image forming system, a sub-host 80 is added to the user side system 1 in FIG. 1. The sub-host 80 is a control apparauts which controls the image forming apparatus 10 connected to LAN 4 (in detail, when viewed from the LAN 4, it is connected inside the fire wall 5), and a system which obtains the rewrite program of the controlled image forming apparatus from the host 20, and stores it, through the LAN 4, fire wall 5, and internet 3. In more details, this sub-host 80 grasps the condition of the image forming apparatus controlled by the sub-host 80, in the present embodiment, grasps the condition of the image forming apparatus by controlling the condition of the program (version) of the image forming apparatus, and obtains the rewrite program of the image forming apparatus controlled by the sub-host itself from the host 20, and stores it. This sub-host 80 has a display section 81, the second memory section 82, control section 83, communication section 84, and ID memory section 85.

The display section 81 is a display section on which the condition of the image forming apparatus is displayed in order to grasp the condition of the image forming apparatus. That is, when views the display, it can be grasped which image forming apparatus installs which version program. Further, the display section 81 can also display the rewrite program to be obtained from the host 20.

The second memory section 82 is a memory section, for example, a flash memory, in which the version-up edition of each kind of program, which is down loaded from the host 20, of the image forming apparatus controlled by the sub-host 80, or the rewrite program which is bug-corrected, is stored. The control section 83 is a control section to control the sub-host 80. Further, the communication section 84 conducts the transmission and reception of the information in the LAN 4, or the communication of the transmission and reception of the information to the internet 3 through the LAN 4 and fire wall 5.

The ID memory section 85 is a memory section to store each kind of ID information. As the ID information stored in the ID memory section 85, there are not only the information of the sub-host 80 (a serial number to uniquely specify the sub-host 80), password to authorize when the communication to the image forming apparatus 10 is conducted, password to authorize when the communication to the host 20 is conducted, and the serial number of the image forming apparatus controlled by the sub-host 80, but also each kind of program information stored in the first memory section 12 of the image forming apparatus controlled by the sub-host 80, and rewrite program information stored in the second memory section 82 (the date information at which the program is made, version information of the program, history information of the program, and kind of machine information of the image forming apparatus to specify the kind of machine of the objective image forming apparatus).

In this connection, being accompanied to a fact that the sub-host 80 is provided, the ID information stored in the ID memory section 15 of the image forming apparatus are each kind of program information, ID information (serial number) of the image forming apparatus to uniquely specify the image forming apparatus 10, information of the sub-host 80 to control the image forming apparatus 10, and password to authorize when communication to the sub-host 80 is conducted. In the same manner, the ID information stored in the ID memory section 25 of the host 20 are the information of the host 20, password to authorize when the communication to the sub-host 80 is conducted, information (serial number) of the sub-host 80 controlled by the host 20, and rewrite program information stored in the control memory section 22.

Next, the rewriting procedure in the present embodiment 4 will be described. Initially, the procedure by which the rewrite program is down loaded from the host 20 to the sub-host 80, will be described in FIG. 9.

Initially, the sub-host 80 judges whether the rewrite program is in the obtainable condition. Herein, the judgment whether the rewrite program is in the obtainable condition, is conducted in such a manner that, for example, because the communication section 84 is used for obtaining, it is judged whether the communication section 84 is in the not busy condition (condition in which another operation is not conducted) (when not busy, it is in the obtainable condition), or when the down load is conducted, because the memory is used as the working area of the CPU which is a control section 83, it is judged whether this memory is not busy.

Then, when the rewrite program is in the obtainable condition, the sub-host 80 transmits the ID information (serial number) of the sub-host 80 stored in the ID memory section 85, or password to the host 20 by setting the transmission destination according to the information of the host 20 to control the sub-host 80 stored in the ID memory section 85, through the LAN 4, fire wall 5, internet 3, fire wall 7, and LAN 6. When the host 20 receives the ID information transmitted from the sub-host 80, the host 20 replies the ACK showing the normal reception to the sub-host 80.

The host 20 confirms the transmitted data and judges from the information stored in the ID memory section 25, whether the ID information and password of the sub-host 80 received from the sub-host 80 are correct, or it is the sub-host controlled by itself. Then, the data confirmation is completed, and the confirmation result is replied to the sub-host 80 as the reply to the ID transmission. In the case where the sub-host 80 receives the confirmation result, when it is received normally, the ACK is answered to the host 20.

Succeedingly, the sub-host 80 transmits the rewrite program information request to require to transmit the information of the rewrite program stored in the control memory section 22 to the host 20. In the case where the host 20 receives the rewrite program information request, when it is normally received, the ACK is answered to the sub-host 80. Then, as the response to the request, the host 20 replies the information of the rewrite program stored in the control memory section 22 at this time point (that is, the information of the rewrite program stored in the ID memory section 25), as the rewrite program information answer, to the image forming apparatus 10. In the case where the sub-host 80 receives the rewrite program information answer, when it is normally received, the ACK is answered to the host 20.

Then, the sub-host 80 judges whether the version-up edition of the program or the rewrite program such as the bug-correction edition is in the host 20, that is, whether the down load of the rewritable program is necessary, from the information of the received rewritable program and the program information of the image forming apparatus controlled by itself, stored in the ID memory section 85. For this judgment, it is judged whether the rewritable program is newer than the program, according to the program information corresponding to the program (at the present time point) (the date information at which the program is made, date information at which the program is stored, version information, history information, kind of the machine information of the image forming apparatus), and the rewrite program information corresponding to the rewritble program (the date information at which the rewrite program is made, date information at which the rewrite program is stored, version information, history information, kind of the machine information of the image forming apparatus).

Then, when the sub-host 80 judges that down load is necessary, initially, the sub-host 80 selects the rewrite program (as the program, because there are a plurality of programs and a plurality of image forming apparatus are controlled as described above, and because the programs in which the rewriting is necessary, are not limited to only one). When the program is selected, the sub-host 80 transmits the rewrite program request which requires to transmit the selected rewrite program, to the host 20. In the case where the host 20 receives the rewrite program request, when it is received normally, the ACK is answered to the sub-host 80. Then, as the response to the rewrite program request, the host 20 replies the rewrite program data information 1 such as the data quantity (data length) of the rewrite program together with the rewrite program ID to the sub-host 80. In the case where the sub-host 80 receives the rewrite program data information 1, when it is normally received, the ACK is answered to the host 20. When the host 20 receives the ACK, succeedingly, the host 20 replies, as the response to the rewrite program request, the rewritble program data information 2 which is the information relating to the transmission method such as the transfer block information or compression information, together with the rewrite program ID, to the sub-host 80. In the case where the sub-host 80 receives the rewrite program data information 1, when it is normally received, the ACK is answered to the host 20.

When the host 20 receives the ACK, as the answer to the response to the rewrite program request, the host 20 actually replies the rewrite program to the sub-host 80. In this case, because the host 20 replies it by the transmission method shown in the rewrite program data information 2, that is, by each block unit, the sub-host 80 which receives it, accumulates it in the memory, and conducts the data processing of the received data such as the combination of a plurality of blocks, and answer of the compression. Of course, in the case where the sub-host 80 receives the rewrite program, at each time of reception, when it is normally received, the ACK is answered to the host 20, and when the host 20 receives the ACK, the host 20 sends the next block.

As described above, the sub-host 80 repeats the reception of the rewrite program and data receiving processing, until the data corresponding to the data quantity shown in the rewrite program data information 1 is processed, (in the drawing, the repetition 1). Then, in the host 20, when the final block has been replied, the final data notice is replied to the sub-host 80. In the case where the sub-host 80 receives the final data notice, when it is normally received, the ACK is answered to the host 20.

The sub-host 80 which answers the ACK to the host 20, conducts the rewrite program obtaining completion judgment. That is, it judges whether it is necessary that another rewrite program is downloaded, and when the down load is necessary, the sequence returns to the rewritble program selection, and the sub-host 80 repeats the repetition 2 in the drawing until the down load becomes unnecessary.

On the one hand, when the rewrite program obtaining completion is judged, the sub-host 80 transmits the communication completion notice to the host 20. The host 20 receives this signal, and disconnects the circuit to the sub-host 80.

In the manner as described above, in the second memory section 82 of the sub-host 80, the rewrite program of the image forming apparatus controlled by the sub-host 80 is stored. In this connection, from the host 20 to the sub-host 80, as in the embodiment 1, the rewrite program obtaining time is judged, and the obtaining procedure as shown in drawing may be started, and further, as shown in the embodiments 2 or 3, the time point when the down load instruction is transmitted from the host 20 to the sub-host 80, may also be the start of the obtaining procedure as shown in the drawing.

Next, the procedure by which the image forming apparatus 10 down loads the rewrite program stored in the second memory section 2 of the sub-host 80 and rewrites the program, will be described according to FIG. 10.

Initially, the image forming apparatus 10 judges whether the rewrite program is in the obtainable condition. In this connection, as in the embodiment 1, it may also be judged whether it is at the rewrite program obtaining time. Then, when the rewrite program is in the obtainable condition, the image forming apparatus 10 transmits the ID information (serial number) or password of the image forming apparatus 10 stored in the ID memory section 15 to the sub-host 80 through the LAN 4. When the sub-host 80 receives the ID information transmitted from the image forming apparatus 10, the sub-host 10 replies the ACK showing the normal reception to the image forming apparatus 10.

In the sub-host 80, the transmitted data confirmation whether the ID information and password of the image forming apparatus 10 received from the image forming apparatus 10 are correct, or whether it is the image forming apparatus controlled by itself, is conducted and judged from the information stored in the ID memory section 85. Then, the data confirmation is completed, and the confirmation result is replied to the image forming apparatus 10 as the answer to the ID transmission. In the case where the image forming apparatus 10 receives this confirmation result, when it is normally received, the ACK is answered to the sub-host 80.

Succeedingly, the image forming apparatus 10 transmits the rewrite program information request to require to transmit the information of the rewrite program stored in the second memory section 82 of the sub-host 80 to the sub-host 80. In the case where the sub-host 80 receives the rewrite program information request, when it is normally received, the ACK is answered to the image forming apparatus 10. Then, as the response to the request, the sub-host 80 replies the information of the rewrite program stored in the second memory section 82 at this time point (that is, the information of the rewrite program stored in the ID memory section 85), as the rewrite program information answer, to the image forming apparatus 10. In the case where the image forming apparatus 10 receives the rewrite program information answer, when it is normally received, the ACK is answered to the sub-host 80.

Then, the image forming apparatus 10 judges whether the version-up edition of the program or the rewrite program such as the bug-correction edition is in the sub-host 80, that is, whether the down load of the rewitable program is necessary, from the information of the received rewitable program and the program information of the image forming apparatus controlled by itself, stored in the ID memory section 15. Then, when the image forming apparatus 10 judges that down load is necessary, initially, the image forming apparatus 10 selects the rewrite program. When the program is selected, the image forming apparatus 10 transmits the rewrite program request which requires to transmit the selected rewrite program, to the sub-host 80. In the case where the sub-host 80 receives the rewrite program request, when it is received normally, the ACK is answered to the image forming apparatus 10. Then, as the response to the rewrite program request, the sub-host 80 initially replies the rewrite program data information 1 such as the data quantity (data length) of the rewrite program together with the rewrite program ID to the image forming apparatus 10. In the case where the image forming apparatus 10 receives the rewrite program data information 1, when it is normally received, the ACK is answered to the sub-host 80.

When the sub-host 80 receives the ACK, succeedingly, the sub-host 80 replies, as the response to the rewrite program request, the rewritble program data information 2 which is the information relating to the transmission method such as the transfer block information or compression information, together with the rewrite program ID, to the image forming apparatus 10. In the case where the image forming apparatus 10 receives the rewrite program data information 1, when it is normally received, the ACK is answered to the sub-host 80.

When the sub-host 80 receives the ACK, as the response to the rewrite program request, the sub-host 80 actually replies the rewrite program to the image forming apparatus 10. In this case, because the sub-host 80 replies the program by the transmission method shown in the rewrite program data information 2, that is, by each block unit, the image forming apparatus 10 which receives it, accumulates it in the memory, and conducts the data reception processing of the received data such as the combination of a plurality of blocks, and answer of the compression. Of course, in the case where the image forming apparatus 10 receives the rewrite program, at each time of reception, when it is normally received, the ACK is answered to the sub-host 80, and when the sub-host 80 receives the ACK, the sub-host 80 sends the next block.

As described above, the image forming apparatus 10 repeats the reception of the rewrite program and data reception processing, until the data corresponding to the data quantity shown in the rewrite program data information 1 is processed, (in the drawing, the repetition 1). Then, in the sub-host 80, when the final block has been replied, the final data notice is replied to the image forming apparatus 10. In the case where the image forming apparatus 10 receives the final data notice, when it is normally received, the ACK is answered to the sub-host 80.

The image forming apparatus 10 which answers the ACK to the sub-host 80, conducts the rewrite program obtaining completion judgment. That is, it judges whether it is necessary that another rewrite program is downloaded, and when the down load is necessary, the sequence returns to the rewritble program selection, and the image forming apparatus 10 repeats the repetition 2 in the drawing until the down load becomes unnecessary.

On the one hand, when the rewrite program obtaining completion is judged, the sub-host 80 transmits the communication completion notice to the sub-host 80. The sub-host 80 receives this signal, and disconnects the circuit to the image forming apparatus 10. In the manner as described above, in the second memory section 82 of the image forming apparatus 10, the rewrite program of the image forming apparatus controlled by the image forming apparatus 10 is down loaded and stored.

The image forming apparatus 10 which transmits the communication completion notice to the sub-host 80, judges whether the down loaded rewrite program is the rewrite program which may be actually rewritten, further, whether the down loaded rewrite program is correctly down loaded, according to the rewrite program information or rewrite program data information 1.

After that, the image forming apparatus 10 judges the program rewritable condition. This judgment is conducted in such a manner that, when the program is rewritten, it is judged at least whether the program to be written is used, and in order to rewrite more safely, because the memory to be used as the working area of the CPU which is the control section 13, is used for the rewriting, it is judged whether this memory is empty, and further, whether the image forming apparatus 10 is image forming now. Then, when the program is judged as the rewritable condition, the image forming apparatus 10 itself rewrites the program to the rewrite program according to a predetermined program.

Figure 11:
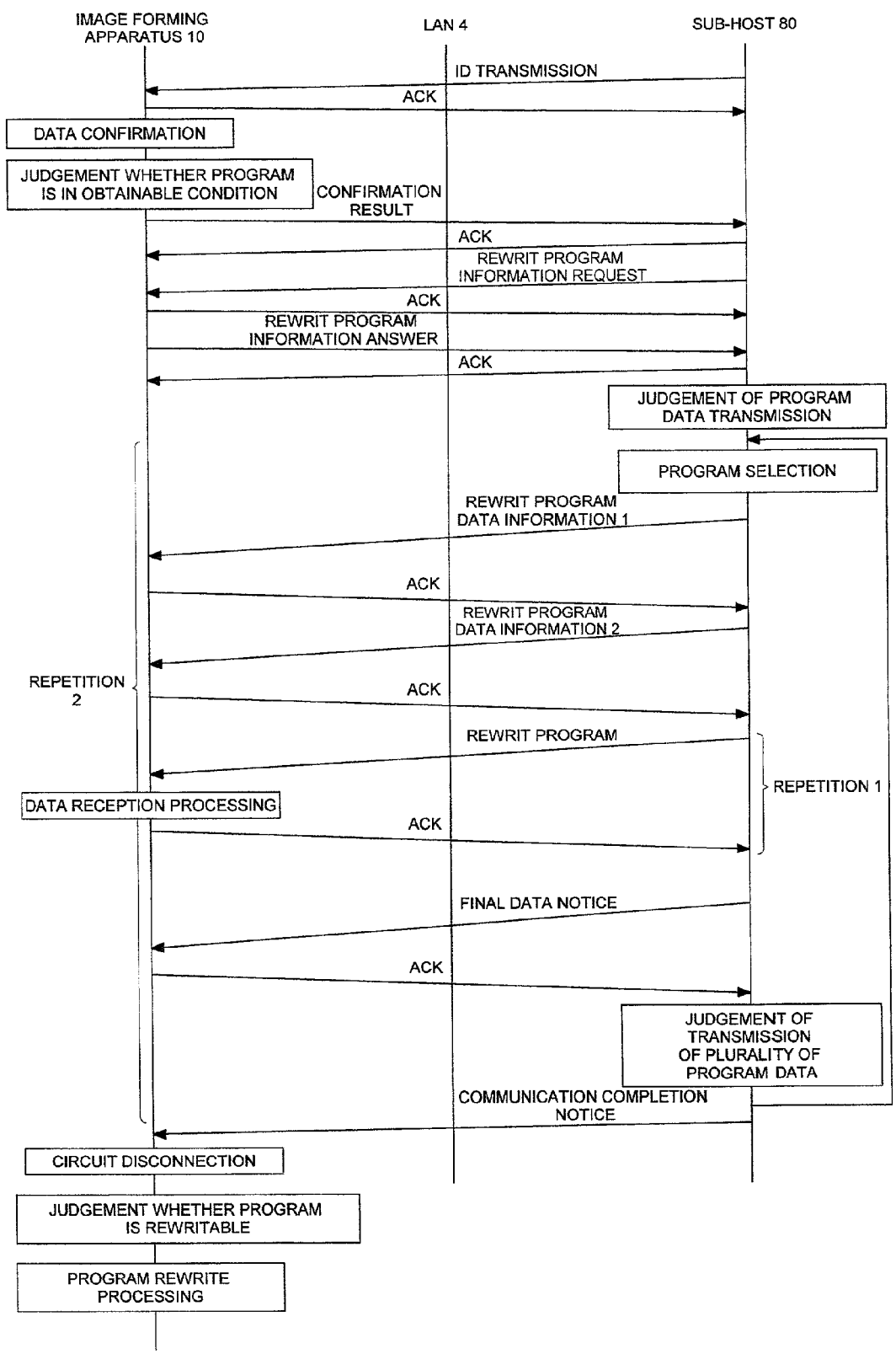
FIG. 11 is a flow chart showing the rewriting procedure of the rewrite program of the embodiment 4 of the present invention.

In this connection, because the transmission and reception of the information between the sub-host 80 and the image forming apparatus 10 is the transmission and reception of the information on the LAN 4 in the fire wall 5, the limitation of the information by the fire wall 5 is not subjected. Therefore, in this LAN 4, the degree of the freedom of the transmission and reception of mutual information is increased to some degree. Accordingly, for the purpose that the image forming apparatus 10 obtains the rewrite program from the sub-host 80, even in the method as shown in FIG. 11, the user side can also cope with the purpose without decreasing the security function by the fire wall 5 (without loosening the limitation). In this connection, because the obtaining procedure of the rewrite program in FIG. 11, is almost the same as in the above embodiment 2, (the host 20 is replaced with the sub-host 80), the explanation will be neglected.

In this connection, in the present embodiment, the sub-host 80 obtains the information from the host through the internet 3, however, it may also obtain the information of the host 20 via a removal storage (recording medium) such as an FD, MD, CD, or DVD.

In the above embodiments, the host 20 transmits the information by dividing it into the rewrite program data information 1 and the rewrite program data information 2 to the image forming apparatus 10, but, the host 20 may also transmit the information without dividing it.

Further, in above embodiments, it is preferable that, when it is completed that the program is rewritten to the rewrite program, the image forming apparatus 10 transmits the ID information of the image forming apparatus 10 and the rewritten program information (rewrite program information) to the host 20, and according to the transmitted information, in the host 20, it is displayed on the display section 21 that the writing of the image forming apparatus 10 is completed, and the condition of the program of the image forming apparatus 10 can be grasped. Of course, it can also be known on the host side whether the image forming apparatus 10 down loads, and it is more preferable that the information joining together with them is also displayed on the display section 21.

As described above, in the image forming system having: the image forming apparatus 10 which has the first memory section 12 in which the program is stored and which is rewritable, and which is operated according to the program, and which conducts the image formation on the recording material; service side system 2 having the control memory section 22 in which the rewrite program of the image forming apparatus 10 is stored; and internet 3 which connects the image forming apparatus 10 and the service side system 2 to each other, because the system is structured in such a manner that the image forming apparatus 10 makes access to the service side system 2 through the internet 3, and obtains the rewrite program stored in the control memory section 22, and rewrits the program stored in the first memory section 12 to the rewrite program, it is not necessary that the service man goes to the installation place of the image forming apparatus, and by the remote operation, the program of the image forming apparatus can be rewritten to the rewrite program, and the reduction of the time and cost can be attained, and the finer control of the image forming apparatus can be conducted. Further, because the newest program can always be used, the facility of the user is increased.

Further, in the above embodiments, before the rewrite program is down loaded, the rewrite program is obtained when the image forming apparatus 10 judges that the rewrite program stored in the control memory section 22 is the rewrite program by which the program stored in the first memory section 12 is to be written, and it can be prevented that the transaction (information transmission density) of the internet 3 or LAN 4 is excessively increased, and which is preferable, however, the system may also be structured in such a manner that the rewrite program stored in the control memory section 22 is down loaded to the image forming apparatus 10 (or, sub-host 80), and it is judged whether the obtained rewrite program is the rewrite program by which the program stored in the first memory section 12 is to be written, and when it is judged to be the rewrite program to be rewritten, the program stored in the first memory section 12 is rewritten to the rewrite program.

Further, in the above embodiments, to the program and the rewrite program, the date information at which the program is made, date information at which the program is stored, version information, history information, or a kind of the machine information of the image forming apparatus (it may also be, at least, one of them) respectively correspond, and by the information, because it is judged whether the rewrite program is the rewrite program by which the program stored in the first memory section 12 is to be written, these information can also easily correspond to the version up, that is, the program can be renewed to the newest program, or to the specially made program (special ordered program).

Further, as described in the embodiments 2 and 3, because the image forming apparatus 10 makes access to the service side system 2 according to the down load instruction transmitted from the service side system 2, and obtains the rewrite program stored in the control memory section 22, and rewrites the program stored in the first memory section 12 to the rewrite program, the image forming apparatus 10 can obtain the rewrite program at the optimum timing, and can rewrite the program.

Particularly, as described in the embodiment 3, because the down load instruction is transmitted through the network (telephone circuit network) different from the network (internet 3) on which the rewrite program is transmitted, the timing is more accurate.

Further, as described in the embodiment 4, when as the image forming system, the sub-host having the second memory section 82 in which the program is stored, is provided, and the sub-host 80 makes access to the serve side system through the public network (inter net 3), and obtains the rewrite program stored in the control memory section 22, and stores it in the second memory section 82, and the image forming apparatus 10 obtains the rewrite program stored in the second memory section 82 through the user network (LAN 4), and by rewriting the program stored in the first memory section 12 to the rewrite program, when a plurality of image forming apparatus existing in the LAN 4, for example, a plurality of same kind of machines exist in the LAN 4, the rewrite program to be obtained through the internet 3 is enough to be only one, thereby, not only the reduction of the time can be attained, but by the sub-host 80, the centralized control of the image forming apparatus in the LAN 4 can be attained by the user itself.

Further, in the above-described embodiments, because when the image forming apparatus 10 is image forming, the obtaining of the rewrite program is inhibited, thereby, the using image forming apparatus 10 is not excessively loaded. Further, when the image forming apparatus is image forming, because it is inhibited that the program is rewritten by the stored rewrite program, thereby, while the program is operated, the trouble accompanied to the rewriting of the program can be excluded.

Further, in the above description, it is preferable that the memory section to store the obtained (received) rewrite program (the program before the rewriting) and the first memory section 12 in which the program is stored are separately provided, however, the area may also be divided in the same hardware (HDD, flash memory, non-volatile memory).

Further, in the above description, various examples are described, and in any case, also when the access is made from the image forming apparatus to the host (or, from the image forming apparatus to the sub-host, or from the sub-host to the host), or also when the access is made from the host to the image forming apparatus (or, from the sub-host to the image forming apparatus, or from the host to the sub-host), the judgment whether the program is a program to be written, may be conducted on the image forming apparatus side or on the host side (or sub-host side).

As detailed above, according to the present invention, the image forming system and the image forming apparatus, by which it is not necessary that the service man goes to the installation place of the image forming apparatus, and the program of the image forming apparatus is rewritten to the rewrite program by the remote operation, thereby, the reduction of the time and cost is attained, and the finer control of the image forming apparatus can be conducted, can be provided.

An embodiment of the remote administrating system to attain the second object of the present invention, image forming apparatus, and administrating apparatus of the present invention will be detailed below.

(Embodiment 5)

Figure 12:
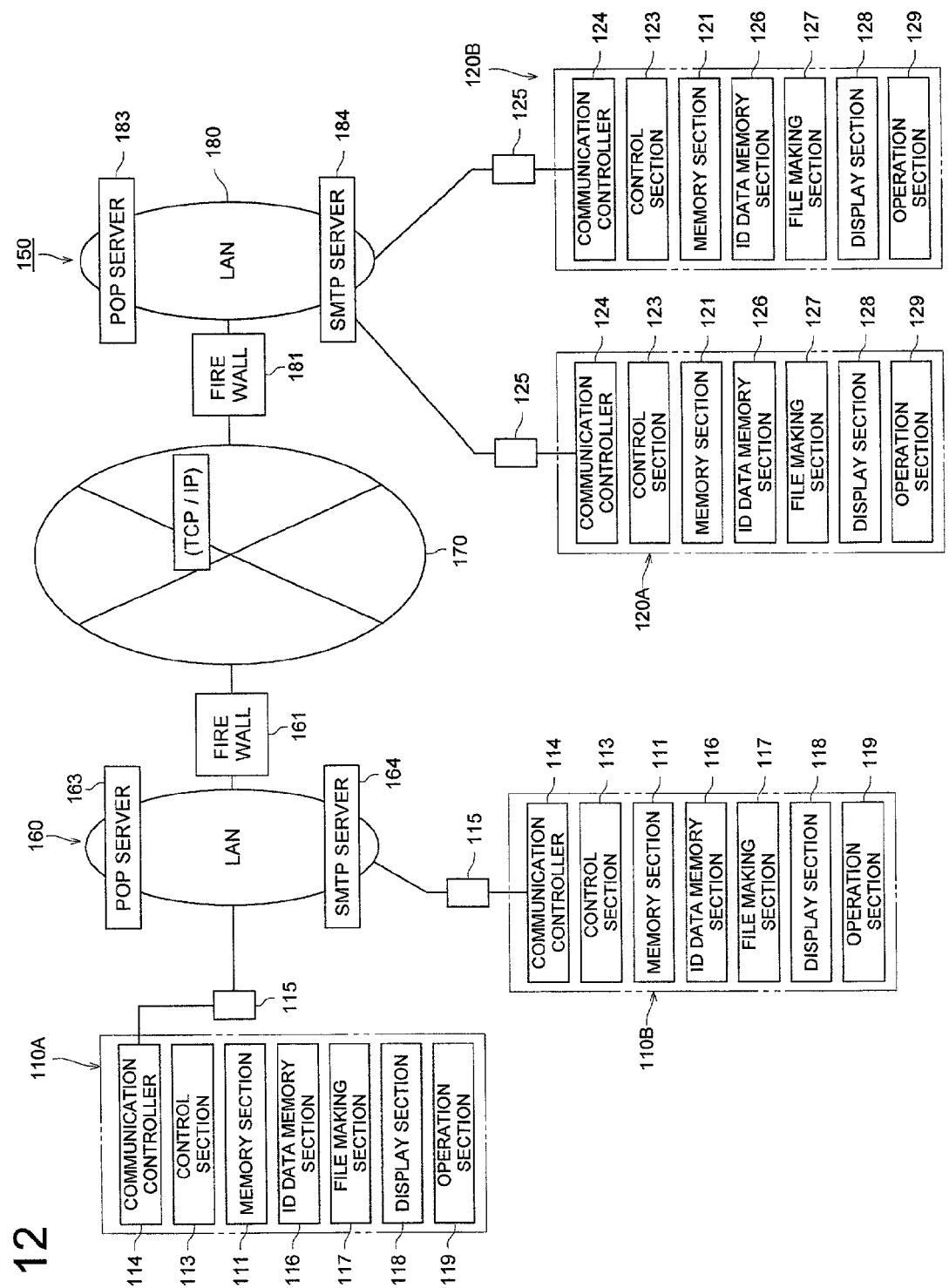
FIG. 12 is a block diagram showing the whole structure of a remote administrating system of the embodiment 5 of the present invention.

FIG. 12 is a black diagram showing the entire structure of the remote administrating system, image forming apparatus and administrating apparatus of the embodiment 5 of the present invention.

This remote administrating system has the memory section 111 composed of for example, nonvolatile memory in which the program is stored and which is rewritable, and the system is operated according to the program, and comprises: for example, 2 image forming apparatus 110A and 110B as the controlled apparatus which conduct the image formation onto the recording material, not shown; for example, 2 administrating apparatus 12GA and 120B as the administrating apparatus to remote control 2 image forming apparatus 110A and 110B; the user network 160 to respectively connect the image forming apparatus 110A and 110B to the administrating apparatus 120A and 120B; the internet 170; the service network 180; and has the network 150 to transmit the information by the TCP/IP.

The image forming apparatus 110A and 110B has: the memory section 111; the control section 113 to control the operation of the image forming apparatus 110 according to the program; the communication controller 114 which is operated based on the control of the control section 113 and conducts the transmission and reception of the information, and functions as the obtaining section to obtain the electronic mail, whose detail will be described later; the ID data memory section 116 to store and output the ID data to transmit the ID (identification) data including the mail address (composed of address name, partition, sub-domain, domain) to process the electronic mail of the administrating apparatus 120A or administrating apparatus 120B, to the network 150; the file making section 117 by which the electronic mail information to transmit to the administrating apparatus 120A and the administrating apparatus 120B is automatically made in a predetermined format; the display section 118 to display each kind of information; the operation section 119 to conduct the key input operation; and the network interface 115 which functions as the transmission and reception section also provided with the function to transmit the information to the user network 160 and receive the information from it. In this connection, of course, the electronic mail information can be made and changed by the key input operation from the operation section 119 in the image forming apparatus 110A and 110B.

Further, the program stored in the memory section 111 is the program which controls the operation of the image forming apparatus 110A or the image forming apparatus 110B, and other than that, in which the program for processing the electronic mail is included.

The control section 113 changes and controls, as will be described later, the time interval at which the POP (Post Office protocol) server 163 (which is the memory apparatus and the user server) to spool the reception mail, provided in the user network 160 through the communication controller 114, is made access to, based on the program for the electronic mail processing.

The ID data is the mail address of the image forming apparatus 110A itself, and the mail address of the administrating apparatus 120A or the administrating apparatus 120B, and other than that, the serial No. (number), authorization PW (password), and the host PW (password) for specifying the administrating apparatus 120A or the administrating apparatus 120B are included.

The administrating apparatus 120A or the administrating apparatus 120B has: a control memory section 121 which stores each kind of information including the program for operation of the administrating apparatus 120A or the administrating apparatus 120B, and the program for the electronic mail processing; the control section 123 to control the operation of the administrating apparatus 120A or the administrating apparatus 120B by the program for operation; the communication controller 124 which performs the same function as the communication controller 114 operating based on the control of the control section 123; the ID data memory section 126 to store and output the ID (identification) data in the same manner as the ID data memory section 116; the file making section 127 to automatically make the electronic mail information; the display section 128 to display each kind of information; the operation section 129 to conduct the key input operation; and the network interface 125 which performs the same function as the network interface 115.

In this connection, of course, the electronic mail information can be made and changed by the key input operation from the operation section 129 in the administrating apparatus 120A and 120B.

Herein, in the ID data in the administrating apparatus 120A or the administrating apparatus 120B, the mail address of the administrating apparatus 120A or the administrating apparatus 120B itself, the mail address of the image forming apparatus 110A or the image forming apparatus 110B, serial No. (number) and the authorization PW (password) of the image forming apparatus 110A or the image forming apparatus 110B, are included.

The control section 123 changes and controls the access time interval to the POP (Post Office Protocol) server 183 which is the memory means functioning as the administrating apparatus side server provided in the service network 180 through the communication controller 124, according to the program for the electronic mail processing.

As the data input means to the ID data memory section 116 and the ID data memory section 126, there are, for example, the operation section to conduct the key input, portable memory means (floppy disk, compact disk (CD), MO, DVD, ID card, etc.) and their combination with the data reading apparatus.

The network 150 is structured by: the user network 160 structured by the LAN to which the image forming apparatus 110A or the image forming apparatus 110B is connected through the network interface 115 controlled by the communication controller 114; the internet 170 which is the general network widely used recently; and the administrating apparatus side network 180 structured by the LAN connected through the network interface 125 controlled by the communication controller 114 to the administrating apparatus 120A or administrating apparatus 120B.

Then, the transmission of the data on each network is conducted by the TCP/IP which is widely used.

Further, in the user network 160, in addition to the POP server 163, the SMTP (Simple Mail Transfer Protocol) server 164 which functions as the transfer server (transmission server) of the electronic mail, is provided, and in the service network 180, in addition to the POP server 183, the SMTP server 184 which functions as the transfer server of the electronic mail is provided.

The user network 160 is connected to the internet 170 through the fire wall 161 of the user side, and by the fire wall 161, the undesired access to the image forming apparatus 110A or image forming apparatus 110B through the user network 160 by the other computer, not shown, connected to the internet 170, is limited.

In the same manner, the service network 180 is connected to the internet 170 through the fire wall 181 on the administrating apparatus side, and by the fire wall 181, the undesired access to the administrating apparatus 120A and administrating apparatus 120B through the service network by the other computer, not shown, connected to the internet 170, is limited.

In this connection, in FIG. 12, an example in which 2 image forming apparatus 110A and 110B are connected to the user network 160, is shown, however, of course, the number of image forming apparatus connected to the user network 160 can be arbitrary numbers such as 3 or 5. In the same manner, the number of administrating apparatus connected to the service network 180 can also be arbitrary numbers such as 3 or 5.

Figure 13:
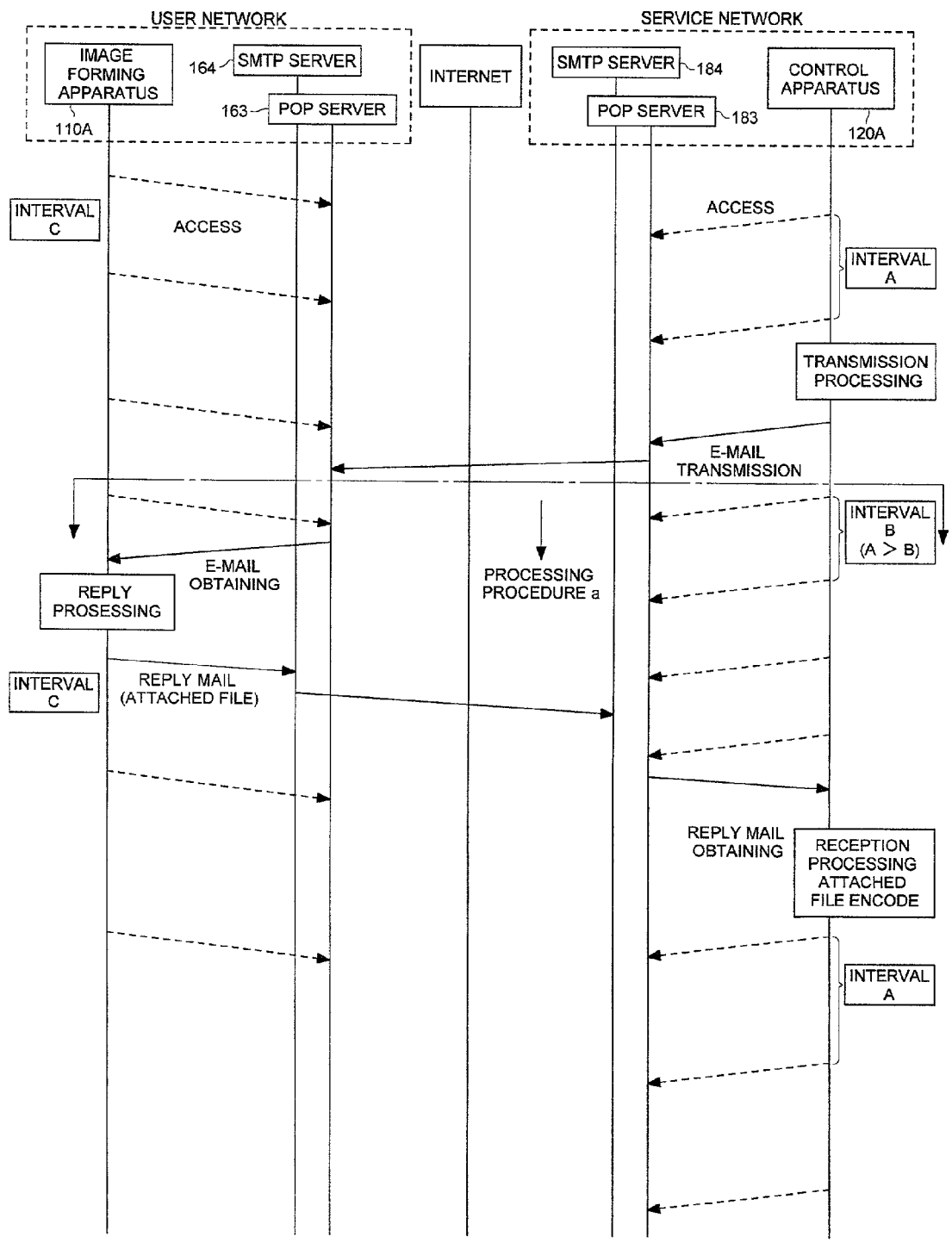
FIG. 13 is a sequence diagram showing the transmission and reception processing of the electronic mail and reply mail between the image forming apparatus and the administrating apparatus of the embodiment 5 of the present invention.

Next, referring to the black diagram shown in FIG. 12, and the sequence diagram shown in FIG. 13, taking the case in which, the electronic mail for the remote diagnosis is transmitted from one administrating apparatus 120A of the administrating apparatus 120A and 120B to, for example, one image forming apparatus 110A of the image forming apparatus 110A and the image forming apparatus 110B, as an example, the operation of the remote administrating system of the present embodiment 1 will be described.

Under the control of the control section 113 of the image forming apparatus 110A, the communication controller 114 makes access to the POP server 163 provided in the user network 160 through the network interface 115 at a predetermined time interval (interval C: for example, at 10 minutes).

On the one hand, under the control of the control section 23 of the administrating apparatus 20A, the communication controller 124 makes access to the POP server 183 provided in the service network 180 through the network interface 125 at a predetermined time interval (interval A: for example, at 9 minutes; interval C>interval A).

In such the condition, in order to remote control the image forming apparatus 110A, the administrating apparatus 120A makes the file for remote control by the file making section 127 under the control of the control section 123, and transmits it as the electronic mail with the mail address which is one of the ID information of the image forming apparatus 110A, to the SMTP server 184 on the service network 180. The SMTP server 184 transmits this electronic mail to the POP server 163 on the user network 160 through the internet 170, and the fire wall 161 on the user network 160 side, and then, after a predetermined time (for example, 5 minutes) has passed, the communication controller 124 makes the access interval to the POP server 183 provided on the service network 180 shorter interval B (for example, 1 minute) than the interval A (interval B<interval A), and is ready for obtaining the reply mail.

The POP server 163 obtains the transmitted electronic mail and stores it. In this case, the data of the electronic mail can pass the fire wall 161 without any trouble, and the undesired access limit function of the fire wall 161 is not functioned.

As described above, after the POP server 163 on the user network 160 obtains the electronic mail for remote control from the administrating apparatus 120A to the image forming apparatus 110A, the communication controller 114 of the image forming apparatus 110A obtains the electronic mail from the POP server 163 corresponding to the first access from the image forming apparatus 110A to the POP server 163 on the user network 160.

The image forming apparatus 110A which obtained the electronic mail, conducts the reply processing corresponding to the content of the electronic mail, that is, the apparatus 110A makes the mail text for the reply to the administrating apparatus 120A and further, the attached file in which the binary file (the binary number type file) is encoded, by the file making section 117 under the control of the control section 113, and transmits this reply mail to the SMTP server 164 on the user network 160 as the reply mail attached with the mail address of the administrating apparatus 120A.

The SMTP server transmits the reply mail to the POP server 183 on the service network 180 through the internet 170, and the fire wall 181. The POP server 183 obtains the reply mail from the administrating apparatus 120A and stores it.

The communication controller 124 obtains the reply mail from the POP server 183, corresponding to the first access in the interval B from the communication controller 124 of the administrating apparatus 120A after that.

The control section 123 of the administrating apparatus 120A which received the reply mail conducts the reception processing of the mail text in the reply mail or the reception processing such as the decode processing of the attached file, and stores the reception processed reply mail in the memory, not shown.

After that, the control section 123 of the administrating apparatus 120A controls the access interval B to the POP server 183 so that it returns to the interval A (9 minutes) before the electronic mail transmission.

According to such the operations, the processing from the transmission of the electronic mail from the administrating apparatus 120A to the image forming apparatus 110A over the fire wall 161 on the network 150, to the obtaining of the reply mail over the fire wall 181 on the network 150, is effectively conducted on the base of time, and the increase of the serviceability to the user by the reduction of the time and the increase of the control efficiency of the remote diagnosis to the image forming apparatus 110A, can be attained.

Further, in the attached file of the reply mail, the binary file is converted into the text data and can be transmitted on the network 150, and because the data compression is possible, the data quantity of the transmitted reply mail is reduced and the transmission efficiency can be increased.

In this connection, in also the electronic mail from the administrating apparatus 120A to the image forming apparatus 110A, it is of course that the attached file in which the binary file is converted into the text data, is also included and can be transmitted.

Further, other than the case where the remote diagnosis of the image forming apparatus 110A is conducted by the administrating apparatus 120A, in the case where the remote diagnosis of the other image forming apparatus 110B is conducted by the administrating apparatus 120A, further, also in the case where the remote diagnosis of the image forming apparatus 110A or the image forming apparatus 110B is conducted by the administrating apparatus 120B, by the same processing as in the above case, the efficiency of the remote diagnosis is respectively increased, and the increase of the serviceability for the user can be attained.

(Embodiment 6)

Next, the remote administrating system and the image forming apparatus and the administrating apparatus of the present embodiment 6 of the present invention will be described.

The structure of the remote administrating system in the present embodiment 6 is the same as the case in the embodiment 5, and further, in the present embodiment 6, in the case where any emergency information (for example, failure of the document scanning unit or the image forming unit) which is the transmission event, occurs, this emergency information is noticed as the electronic mail to the administrating apparatus 120A or 120B, and the embodiment 6 is characterized in the processing when the administrating apparatus 120A or 120B conducts the inquiry for the emergency information.

When the emergency information will be further described, the information of the condition with which the user can not cope, and for which the maintenance of the service man becomes necessary, composed of information of the electric failure such as the power source circuit failure, frequently occurrence information of the jam, shortage of the paper, the mechanical or mechanism failure or the shortage of materials such as the shortage of the toner, or the parts life information of the roller or clutch, in which the transmission is necessary at once from the image forming apparatus 110A to the administrating apparatus 120A, corresponds to the emergency information.

For example, the information that the failure occurs in the image forming apparatus 110A (in this case, particularly, the information that the failure by which the operation of the image forming apparatus 110A can not be continued, is generated), is high in the degree of the emergency. As the emergency information, there is further the information to call the administrating apparatus 120A from the user who is using the image forming apparatus 110A.

Referring to the block diagram in FIG. 12 and the sequence diagram of the present embodiment 6 shown in FIG. 14, the processing of the present embodiment 6 will be described below.

For example, in the image forming apparatus 110A, by the control of the control section 113, the communication controller 114 makes access to the POP server 163 provided in the user network 160 at a predetermined time interval (interval C: for example, at 10 minutes) through the network interface 115.

On the one hand, in the administrating apparatus 120A, by the control of the control section 123, the communication controller 124 makes access to the POP server 183 provided in the service network 180 at a predetermined time interval (interval A: for example, at 9 minutes) through the network interface 125. In the same manner, the control section 123 of the administrating apparatus 120B makes also access to the POP server 183 at the interval A.

In this condition, it is presumed that the emergency information as described in the image forming apparatus 110A is generated.

In this case, under the control of the control section 113 of the image forming apparatus 110A, the electronic mail including the emergency information with the mail address of the administrating apparatus 120A or the administrating apparatus 120B is made in the same manner as in the case described in the embodiment 1, and the image forming apparatus 110A transmits the electronic mail to the SMTP server 164 on the user network 160.

After that, the control section 113 of the image forming apparatus 110A changes and controls the access interval to the POP server 163, from the interval C to the shorter interval D (for example, 1 minute), and is ready for the reception of the reply mail from the administrating apparatus 120A or the administrating apparatus 120B.

The SMTP server 164 transmits the electronic mail from the image forming apparatus 110A to the POP server 183 on the service network 180 through the internet 170 and the fire wall 181.

The POP server 183 obtains the transmitted electronic mail and judges the mail address, and when the mail address is for the administrating apparatus 120A, it transmits the electronic mail to the administrating apparatus 120A. Further, when the mail address is for the administrating apparatus 120B, it transmits the electronic mail to the administrating apparatus 120B.

Herein, it is presumed that the mail address is for the administrating apparatus 120A, and the following description will be conducted.

The administrating apparatus 120A conducts the reception processing of the transmitted electronic mail from the image forming apparatus 110A, and in order to conduct the inquiry processing of more details to the emergency information included in the electronic mail under the control of the control section 123, the administrating apparatus 120A makes the reply mail attached with the mail address of the image forming apparatus 110A including the content of the inquiry, and transmits the mail to the SMTP server 184 on the service network 180.

The SMTP server 184 transmits the electronic mail to the POP server 163 on the user network 160 through the internet 70, and the fire wall 161 on the user network 160 side.

After that, the control section 123 changes and controls the interval of the access to the POP server 183 provided on the service network 180 to the interval B (interval B>interval A), and is ready for the reception of the succeeding electronic mail from the image forming apparatus 110A, and thereby, the succeeding electronic mail from the image forming apparatus 110A including the answer to the inquiry can be quickly obtained, and the increase of the serviceability for the user by the increase of the speed of the trouble shooting processing and the increase of the control efficiency, is attained.

After the change and control of the access interval to the POP server to the interval B, the same procedure as in the case of the processing procedure (a) shown in FIG. 13 is conducted.

The POP server 163 on the user network 160 obtains and stores the transmitted reply mail.

As described above, after the POP server 163 on the user network 160 obtains the reply mail including the content of the inquiry to the emergency information from the administrating apparatus 120A to the image forming apparatus 110A, the image forming apparatus 110A obtains the reply mail from the POP server 163, corresponding to the first access at the interval D to the POP server 163 on the user network 160 by the control section 113 of the image forming apparatus 110A.

After this, the control section 113 changes and controls the interval of the access to the POP server 163 provided on the user network 160 from the interval D to the interval C whose time interval is longer than that of the interval D (interval C>interval D), and returns to the steady state.

The access interval to the POP server 163 after the time point at which the interval is changed and controlled to the interval C, is changed in the same manner as in the processing procedure (a) shown in FIG. 13.

By such the operation, the speed of the processing, from the transmission of the electronic mail at the time of the occurrence of the emergency information to the administrating apparatus 120A from the image forming apparatus 110A, to the obtaining by the image forming apparatus 110A of the reply mail including the inquiry information to the emergency information from the administrating apparatus 120A, can be increased, and the efficiency of the remote diagnosis processing at the apparatus failure generation of the image forming apparatus 110A is increased, and the increase of the serviceability for the user can be attained.

According to the invention of (6), when the information is transmitted from one of the controlled apparatus or the administrating apparatus to the other, the controlled apparatus or the administrating apparatus which obtains the information makes access to the memory apparatus provided on the network and when the information exists in the memory apparatus, it obtains the information, and after that, it changes the interval of the access to the memory apparatus.

Accordingly, a remote administrating system in which, between the administrating apparatus and the controlled apparatus, when the information is transmitted from one of the administrating apparatus or the controlled apparatus to the other, after the information is obtained from the memory apparatus provided on the network, the succeeding information can be efficiently obtained on the base of time, can be provided.

According to the invention described in (7), after one of the controlled apparatus or the administrating apparatus transmits the transmission information to the other, or receives the transmission information from the other, the one reduces the interval of the access. Accordingly, when the transmission of the reply information is conducted corresponding to the transmission of the information between the administrating apparatus and the controlled apparatus, and transmission information, a remote administrating system in which the information of the other side apparatus can be effectively obtained on the base of time, and the increase of the control efficiency such as the remote diagnosis for the controlled apparatus can be attained, can be provided.

According to the invention described in (8), because the controlled apparatus or the administrating apparatus which obtains the transmission information, accumulates the reply information corresponding to the transmission information in the memory apparatus provided on the network, a remote administrating system which can always cope with the access to obtain the information from the one or the other of the controlled apparatus or the administrating apparatus, can be provided.

According to the invention described in (9), after one of the controlled apparatus or the administrating apparatus obtains the reply information corresponding to the information from the other, or after a predetermined time has passed after the transmission of the information to the other, the one apparatus increases the access interval. Accordingly, when the transmission of the information between the administrating apparatus and the controlled apparatus, and the transmission of the reply information corresponding to the transmission information are conducted, after the reply information is obtained, or after a predetermined time has passed after the transmission of the information to the other, the controlled apparatus or the administrating apparatus can be in the condition of the remote control at the normal time.

According to the invention described in (10) or (11), a remote administrating system in which, the transmission of the information between the administrating apparatus and the controlled apparatus, or the transmission of the reply information corresponding to the transmission information, can be effectively conducted on the base of time, in the form of the electronic mail by the IP connection, by utilizing the user network to which the controlled apparatus is connected, the service network to which the administrating apparatus is connected, and the network composed of the internet through the user network and the service network, and by utilizing the memory apparatus which is connected to the user network or the service network, that is, the server to spool the electronic mail, can be provided.

According to the invention described in (12), in the remote administrating system described in any one of (6) to (11), because the controlled apparatus is the image forming apparatus which forms the image onto the recording material, a remote administrating system in which the transmission and reception of the electronic mail and reply mail between the administrating apparatus and the controlled apparatus can be effectively conducted on the base of time, and the increase of the serviceability for the user by the reduction of the time of the remote dignosis can be attained, can be provided.

According to the invention described in (13), because, after the electronic mail is transmitted to the administrating apparatus, the time interval of the access to the user server is reduced, the reply mail transmitted from the administrating apparatus can be obtained quickly, thereby, the image forming apparatus which can quickly cope with the failure occurrence time, can be provided.

According to the invention described in (14), because, after the information such as the electronic mail is transmitted to the image forming apparatus, the system is operated so that a predetermined interval of the access to the service server is reduced, the reply mail from the image forming apparatus can be quickly obtained, thereby, an administrating apparatus by which the control such as the remote diagnosis to the image forming apparatus can be effectively conducted on the base of time, can be provided.

According to the invention described in (15), because the information when the administrating apparatus or the controlled apparatus transmits the information to the controlled apparatus or the administrating apparatus, is transmitted by encoding the binary file as the attached file of the electronic mail, a remote administrating system in which the risk of the information leakage when the network is used, is low, and the safety is excellent, can be provided.

According to the invention described in (16), because the ID information of the controlled apparatus or the administrating apparatus is attached to at least one of the text of the electronic mail or the attached file, the specification of the transmission destination when the electronic mail is transmitted to the controlled apparatus or the administrating apparatus by utilizing the network, is easy, and a remote administrating system by which the control efficiency can be increased, can be provided.

According to the invention described in (17), because the service server on the service network to which a plurality of administrating apparatus are connected, selects the administrating apparatus to transmit the information, according to the ID information of the controlled apparatus added to the electronic mail transmitted from the controlled apparatus, and the attached file is transmitted to the selected administrating apparatus, the transmission of the electronic mail from the controlled apparatus to the specific administrating apparatus can be quickly conducted, and a remote administrating system by which the control efficiency of the controlled apparatus can be increased, can be provided.

According to the invention described in (18), in the remote administrating system described in any one of (15) to (17), because the controlled apparatus is the image forming apparatus which forms the image onto the recording material, the transmission of the electronic mail from the image forming apparatus to the administrating apparatus to control the image forming apparatus can be effectively conducted on the base of time, and a remote administrating system by which the increase of the serviceability for the user of the image forming apparatus by the increase of the speed of the electronic mail transmission can be attained, can be provided.

According to the invention described in (19), because the information when the it is transmitted from the image forming apparatus to the administrating apparatus, is transmitted by encoding the binary file as the attached file of the electronic mail, an image forming apparatus in which the risk of the information leakage when the network is used, is low, and the safety is excellent, can be provided.

According to the invention described in (20), because the information transmitted to this network is obtained by the memory apparatus connected to the network, and the accumulated information is transmitted to the controlled apparatus or the administrating apparatus, a remote administrating system in which the obtaining of the information in the controlled apparatus or the administrating apparatus is easy, and the increase of the control efficiency to the controlled apparatus can be attained, can be provided.

According to the invention described in (21), a remote administrating system in which the obtaining of the emergency information by the administrating apparatus and the obtaining of the emergency information by the controlled apparatus can be quickly conducted, and the correspondence at the emergency time such as the trouble shooting processing of the controlled apparatus can be quickly conducted, can be provided.

According to the invention described in (22), because the controlled apparatus or the administrating apparatus makes access to the memory apparatus and when the information accumulated in the memory apparatus exists, it obtains the information, a remote administrating system in which the obtaining of the information by the controlled apparatus or the administrating apparatus is easy, and the increase of the control efficiency to the controlled apparatus can be attained, can be provided.

According to the invention described in (23), in the remote administrating system described in any one of (20) to (22), because the controlled apparatus is the image forming apparatus which forms the image onto the recording material, a remote administrating system by which the increase of the control efficiency to the image forming apparatus can be attained, can provided.

What is claimed is:

1. An image forming system, comprising:
   (i) an image forming apparatus to form an image on a recording material, said image forming apparatus comprising:

a first memory section to store a program to conduct a predetermined operation;

an image forming section which forms the image on the recording material based on image data;

a control section which controls the image forming section to form the image based on the program stored in the first memory section;

an ID memory section which stores a serial number of the image forming apparatus and program information about the program stored in the first memory section; and an image forming apparatus connecting section to connect the image forming apparatus with a network; and (ii) an administrating apparatus to administrate the image forming apparatus through the network, said administrating apparatus comprising:

an administrating memory section to store a rewrite program for the image forming apparatus;

an ID memory section which stores at least one serial number corresponding to at least one said image forming apparatus to be administrated and rewrite program information about the rewrite program stored in the administrating memory section; and an administrating apparatus connecting section to connect the administrating apparatus with the network;

wherein the image forming apparatus; (a) communicates with the administrating apparatus through the network, (b) obtains the rewrite program stored in the administrating memory section, and (c) rewrites the program stored in the first memory section with the obtained rewrite program when the serial number stored in the ID memory section of the image forming apparatus corresponds to one said at least one serial number stored in the ID memory section of the administrating apparatus, and when the rewrite program is determined to be newer than the program stored in the first memory section based on the rewrite program information stored in the administrating apparatus and the program information stored in the ID memory section.

2. The image forming system of claim 1, wherein the network comprises an internet.

3. The image forming system of claim 1, wherein the image forming apparatus determines whether the program stored in the first memory section should be rewritten by the rewrite program stored in the administrating memory section either before or after the image forming apparatus obtains the rewrite program.

4. The image forming system of claim 3, wherein the image forming apparatus determines whether the program stored in the first memory section should be rewritten by the rewrite program stored in the administrating memory section based on at least one of producing date information, storing date information, version information, and history information.

5. The image forming system of claim 1, wherein the administrating memory section stores a plurality of rewrite programs.

6. The image forming system of claim 1, wherein the image forming apparatus downloads the rewrite program in accordance with a download instruction transmitted from the administrating apparatus.

7. The image forming system of claim 6, wherein the download instruction is transmitted through another network different from the network through which the rewrite program is obtained.

8. The image forming system of claim 7, wherein the network through which the rewrite program is obtained comprises an internet, and the network through which the download instruction is transmitted is a telephone line.

9. The image forming system of claim 1, wherein the image forming apparatus is provided in a local user network that includes a sub-host section which comprises a second memory section to store the rewrite program is provided; and wherein the image forming apparatus obtains the rewrite program through the sub-host section.

10. The image forming system of claim 9, wherein the sub-host section judges whether the program stored in the first memory section should be rewritten by the rewrite program stored in the administrating memory section, and obtains the rewrite program based on the judgment.

11. The image forming system of claim 9, wherein the image forming apparatus determines whether the program stored in the first memory section should be rewritten by the rewrite program stored in the second memory section either before or after the image forming apparatus obtains the rewrite program.

12. The image forming system of claim 9, wherein the image forming apparatus determines whether the program stored in the first memory section should be rewritten by the rewrite program stored in the administrating memory section based on at least one of producing date information, storing date information, version information, and history information.

13. The image forming system of claim 9, wherein the sub-host section obtains a rewrite program for a plurality of image forming apparatuses connected to the local user network from the administrating section and administrates rewriting a program of the plurality of image forming apparatuses.

14. The image forming system of claim 9, wherein the image forming apparatus obtains the rewrite program stored in the second memory in accordance with a download instruction transmitted from the sub-host section.

15. The image forming system of claim 9, wherein the sub-host section accesses the administrating apparatus in accordance with a download instruction transmitted from the administrating apparatus.

16. The image forming system of claim 1, wherein the image forming apparatus is prohibited to rewrite the program stored in the first memory while forming the image on the recording material.

17. The image forming system of claim 16, wherein the image forming apparatus is prohibited to obtain the rewrite program while forming the image on the recording material.

18. An image forming apparatus to form an image on a recording material, comprising:

a first memory section to store a program to conduct a predetermined operation;

an image forming section which forms the image on the recording material based on image data;

a control section which controls the image forming section to form the image based on the program stored in the first memory section;

an ID memory section which stores a serial number of the image forming apparatus and program information about the program stored in the first memory section; and a first connecting section to connect the image forming apparatus with a network;

wherein the image forming apparatus:

(a) communicates through the network with an administrating apparatus which is provided on the network and which stores a rewrite program for the image forming apparatus, (b) obtains the rewrite program, and (c) rewrites the program stored in the first memory section with the obtained rewrite program when the serial number stored in the ID memory section of the image forming apparatus corresponds to a serial number stored in the administrating apparatus, and when the rewrite program is determined to be newer than the program stored in the first memory section based on rewrite program information stored in the administrating apparatus and the program information stored in the ID memory section.

19. The image forming apparatus of claim 18, wherein the network comprises an internet.

20. The image forming apparatus of claim 18, wherein the image forming apparatus determines whether the program stored in the first memory section should be rewritten by the rewrite program stored in the administrating memory section either before or after the image forming apparatus obtains the rewrite program.

21. The image forming apparatus of claim 18, wherein the network through which the rewrite program is obtained comprises an internet;

wherein the image forming apparatus further comprises a second communicating device to connect with a telephone line; and wherein the image forming apparatus obtains the rewrite program in accordance with a download instruction transmitted from the administrating apparatus through the telephone line.

22. The image forming apparatus of claim 18, wherein the image forming apparatus is prohibited to rewrite the program stored in the first memory while forming the image on the recording material.

23. The image forming apparatus of claim 22, wherein the image forming apparatus is prohibited to obtain the rewrite program while forming the image on the recording material.

* * * * *